United States Patent [19]
Terada et al.

[11] Patent Number: 6,035,116
[45] Date of Patent: Mar. 7, 2000

[54] INFORMATION PROCESSING APPARATUS HAVING AN INITIALIZING EMULATION PROGRAM TO PROVIDE COMPATIBILITY BETWEEN DIFFERENT MODELS

[75] Inventors: Hajime Terada, Chiba; Mitsuru Takehara, Tokyo, both of Japan

[73] Assignee: Sony Corporation, Tokyo, Japan

[21] Appl. No.: 08/909,431

[22] Filed: Jan. 9, 1997

Related U.S. Application Data

[63] Continuation of application No. 08/049,806, Apr. 20, 1993, abandoned.

[30] Foreign Application Priority Data

| Apr. 27, 1992 | [JP] | Japan | P04-134123 |
| Apr. 27, 1992 | [JP] | Japan | P04-134124 |

[51] Int. Cl.⁷ .................................................. G06F 9/455
[52] U.S. Cl. ................ 395/500.45; 395/527; 395/500.48
[58] Field of Search .................................. 395/527, 500, 395/705, 500.45, 500.48; 714/1, 25, 28, 29; 364/488–491, 578; 324/500; 711/4, 103; 704/2; 707/4

[56] References Cited

U.S. PATENT DOCUMENTS

| 4,514,803 | 4/1985 | Agnew et al. ........................... 395/500 |
| 4,589,063 | 5/1986 | Shah et al. ................................. 710/8 |
| 4,722,047 | 1/1988 | Chan et al. ............................. 711/202 |
| 4,779,187 | 10/1988 | Letwin .................................... 712/229 |
| 4,858,114 | 8/1989 | Heath et al. ............................ 395/500 |
| 4,926,322 | 5/1990 | Stimac et al. .......................... 395/500 |
| 5,014,193 | 5/1991 | Garner et al. ............................ 710/10 |
| 5,036,484 | 7/1991 | McCoy et al. .......................... 395/500 |
| 5,091,720 | 2/1992 | Wood ...................................... 345/507 |
| 5,177,728 | 1/1993 | Otsubo et al. ............................ 369/48 |
| 5,179,703 | 1/1993 | Evans ...................................... 395/703 |
| 5,291,585 | 3/1994 | Sato et al. ............................... 395/500 |
| 5,319,770 | 6/1994 | Lehman ................................... 395/500 |
| 5,325,532 | 6/1994 | Crosswy et al. ..................... 364/280.2 |
| 5,331,423 | 7/1994 | Ota et al. ................................ 386/125 |
| 5,440,693 | 8/1995 | Arnold et al. .......................... 710/104 |
| 5,446,898 | 8/1995 | Bealkowski et al. .................... 364/231 |

FOREIGN PATENT DOCUMENTS

| 0 318 599 A1 | 7/1989 | European Pat. Off. ........ G06F 3/023 |

OTHER PUBLICATIONS

Kaufmann, S.M., Automated System Initializaiton, IBM Technical Disclosure Bulletin, vol. 15 No. 10, pp. 3215–3216, Mar. 1973.

Wolverton, Running MS Dos, Microsoft Press (1985), pp 15, 140–144.

*80286 Data Sheet Intel Microprocessors,* vol. II, Intel Corporation 1991, (pp. 5–60 to 5–115).

*Primary Examiner*—John A. Follansbee
*Attorney, Agent, or Firm*—Limbach & Limbach L.L.P.

[57] ABSTRACT

An information processing system and apparatus and an information recording medium wherein the compatibility of a program between preceding and succeeding models is assured without requiring a high cost are disclosed. In such a case wherein different models such as first, second and third apparatus are developed successively in time, emulation programs for the different models are stored in advance in program ROMs of the respective models. A difference in processing between the different models is accommodated by one of the emulation programs to establish compatibility between the operations of them. Before an application program is executed on any one of the apparatus, the emulation program is first started up.

6 Claims, 22 Drawing Sheets

INFORMATION PROCESSING APPARATUS HAVING AN INITIALIZING EMULATION PROGRAM TO PROVIDE COMPATIBILITY BETWEEN DIFFERENT MODELS

This is a continuation of application Ser. No. 08/049,806 filed on Apr. 20, 1993 now abandoned.

BACKGROUND OF THE INVENTION

1. Field of the Invention

This invention relation relates to an information processing system and apparatus and an information recording medium suitable for use with a reproducing apparatus which reproduces a CD-ROM (compact disk read only memory) of, for example, the XA format.

2. Description of the Related Art

Information processing apparatuses such as personal computers and electronic notebook apparatuses can process information by various methods with various application programs. In those information processing apparatus, a function is set not only from a technical factor but also from various economic factors. For example, while it is technically possible to initially provide to the market an apparatus having various functions. it is often the case that a model having only a simple function is first put on the market from the point of view of the price. In such an instance, apparatuses having higher functions are successively put on the market.

Normally, different models have different functions in this manner, and a difference in function results in difference in construction. As a result, it sometimes occurs that an application program developed for a preceding model cannot be utilized in a succeeding model.

Similarly, it sometimes occurs that an application program for a succeeding model cannot be used in a preceding model. In order to avoid this, it is a possible solution for each application program to cope so that it may cover a preceding model. This, however, provides a subject to be solved so that much time and labor are required for development of each program and a high cost is involved.

SUMMARY OF THE INVENTION

It is an object of the present invention to provide an information processing system and apparatus and an information recording medium wherein the compatibility of a program between preceding and succeeding models of the apparatuses is assured, without requiring a high cost.

In order to attain the object described above, according to an aspect of the present invention, there is provided an information processing system which assures the compatibility of a program between information processing apparatus of different models, which comprises means for causing each of the information processing apparatus to execute an initializing operation for cancelling any difference between processing operations of the various information processing apparatuses to establish compatibility between the processing operations.

In the information processing system, an initializing operation for cancelling any difference between processing operations of the various information processing apparatuses to establish compatibility between the processing operations is first executed on each of the information processing apparatus before any further processing takes place. Accordingly, the compatibility of a program between the different models can be assured.

According to another aspect of the present invention, there is provided an information processing system which assures the compatibility of a program between information processing apparatuses of different models, which comprises means for causing each of the information processing apparatus to store therein an emulation program for accommodating a difference between processing operations of the information processing apparatus to establish compatibility between the processing operations, each of application programs to be executed on each of the information processing apparatus having a step for execution of the emulation program.

In the information processing apparatus, an emulation program for accommodating a difference between processing operations of the information processing apparatus to establish compatibility between the processing operations is stored into any of the information processing apparatuses, and each of the application programs to be executed on each of the information processing apparatuses has a step for execution of the emulation program. Accordingly, the compatibility of a program between the different models can be assured without involving a rise of the cost.

According to a further aspect of the present invention, there is provided an information processing apparatus having the compatibility with another model, which comprises storage means for storing therein an emulation program for accommodating a difference between processing operations of different models to establish compatibility between the processing operations.

In the information processing apparatus, an emulation program for accommodating a difference between processing operations of different models to establish compatibility between the processing operations is stored in each of the models. Accordingly, each of the models can use a program for each other model.

According to a still further aspect of the present invention, there is provided an information recording medium which is reproduced on an information processing apparatus having an emulation program for accommodating a differences in processing between different models and provides an application program, wherein a program for causing the emulation program to be executed is recorded on the information recording medium.

In the information recording medium, a program for causing the emulation program, which is provided for accommodating differences in processing between different models, to be executed is recorded thereon. Accordingly, the information recording medium can be used on any of the different models.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Referring first to FIGS. 1 to 4, there is shown a CD-ROM reproducing apparatus to which an information processing apparatus of the present invention is applied. The reproducing apparatus shown includes, as basic components, a body 1, and an inner lid 2 and an outer lid 3 mounted for individual pivotal motion on the body 1. The body 1 and the inner and outer lids 2 and 3 are all formed from a synthetic resin. The reproducing apparatus has a size of, as seen from FIG. 1, about 180 mm wide, about 48 mm thick and about 147 mm deep so that it can be carried similarly to a computer of the notebook type.

Figure 1:
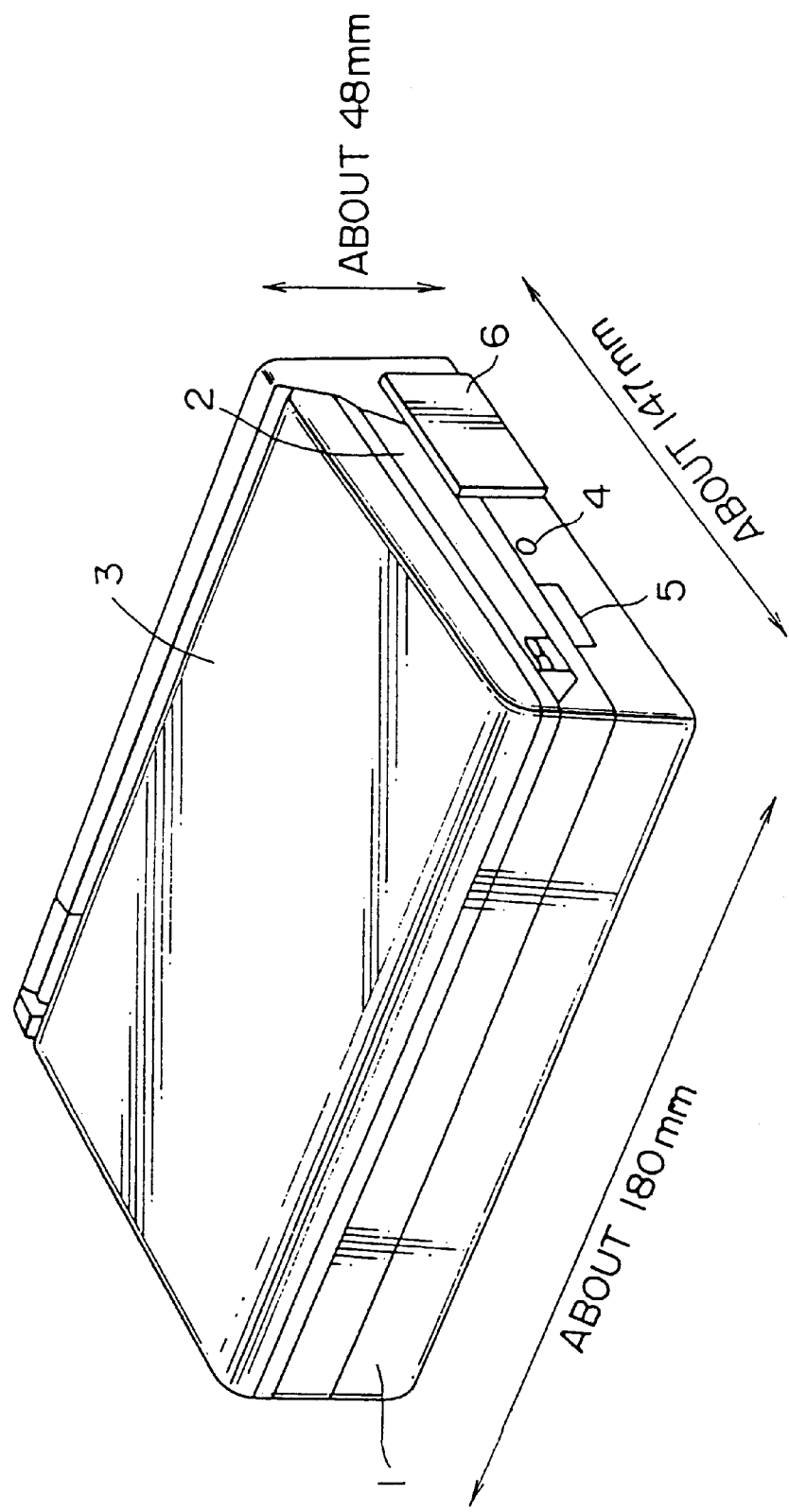
FIG. 1 is a perspective view of a CD-ROM reproducing apparatus to which an information processing apparatus of the present invention is applied showing a preferred embodiment of the present invention.
Figure 2:
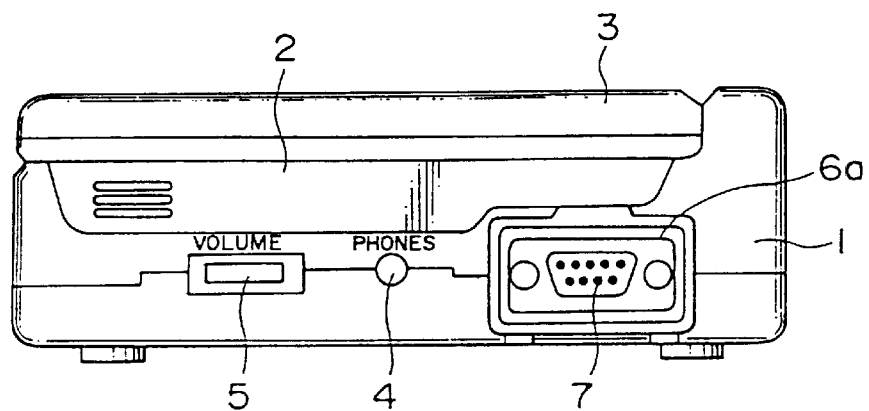
FIG. 2 is a right-hand side elevational view of the CD-ROM reproducing apparatus of FIG. 1.

Referring particularly to FIGS. 1 and 2. a jack 4 for connection to a headphone (not shown) and a volume button 5 are provided on a right-hand side face of the body 1. The volume button 5 is used to adjust the level of an audio signal to be outputted to the headphone or a loudspeaker 37 (which will be hereinafter described with reference to FIG. 6) built into the body 1. Also a plug 7 for connection to an RS232C cable is provided on the right-hand side face of the body 1 so as to allow communication of data with an external apparatus. When no RS232C cable is connected to the plug 7, a hole 6a in which the plug 7 is provided is closed with a cap 6 made of rubber so that dust or some other foreign article may not be admitted into the hole 6a.

Figure 3:
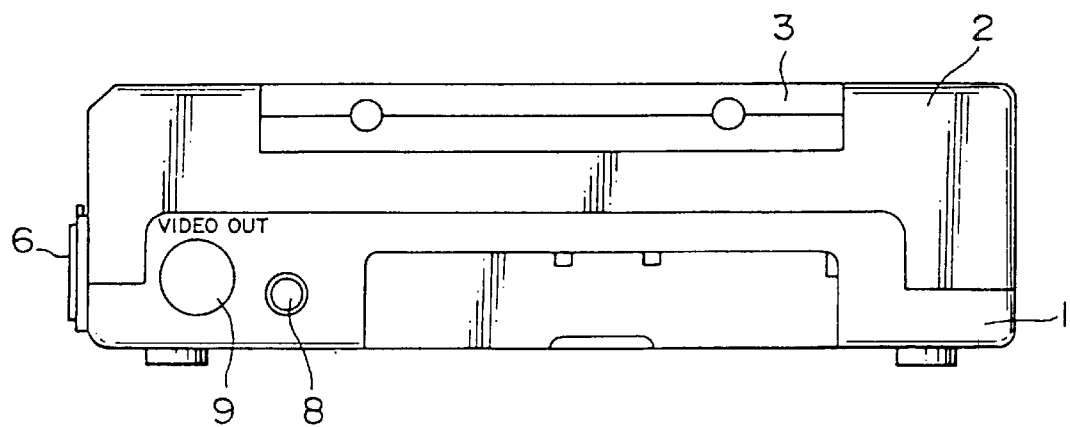
FIG. 3 is a rear elevational view of the CD-ROM reproducing apparatus of FIG. 1.

Referring now to FIG. 3, a jack 8 is provided on a rear face of the body 1 so that dc power may be supplied to various circuits (which will be hereinafter described in detail with reference to FIG. 9) accommodated in the inside of the body 1. A video output terminal 9 is provided alongside the jack 8 so that a video signal based on video data reproduced from a CD-ROM 66 (which will be hereinafter described with reference to FIG. 7) loaded in position in the body 1 may be outputted to an external apparatus.

Figure 4:
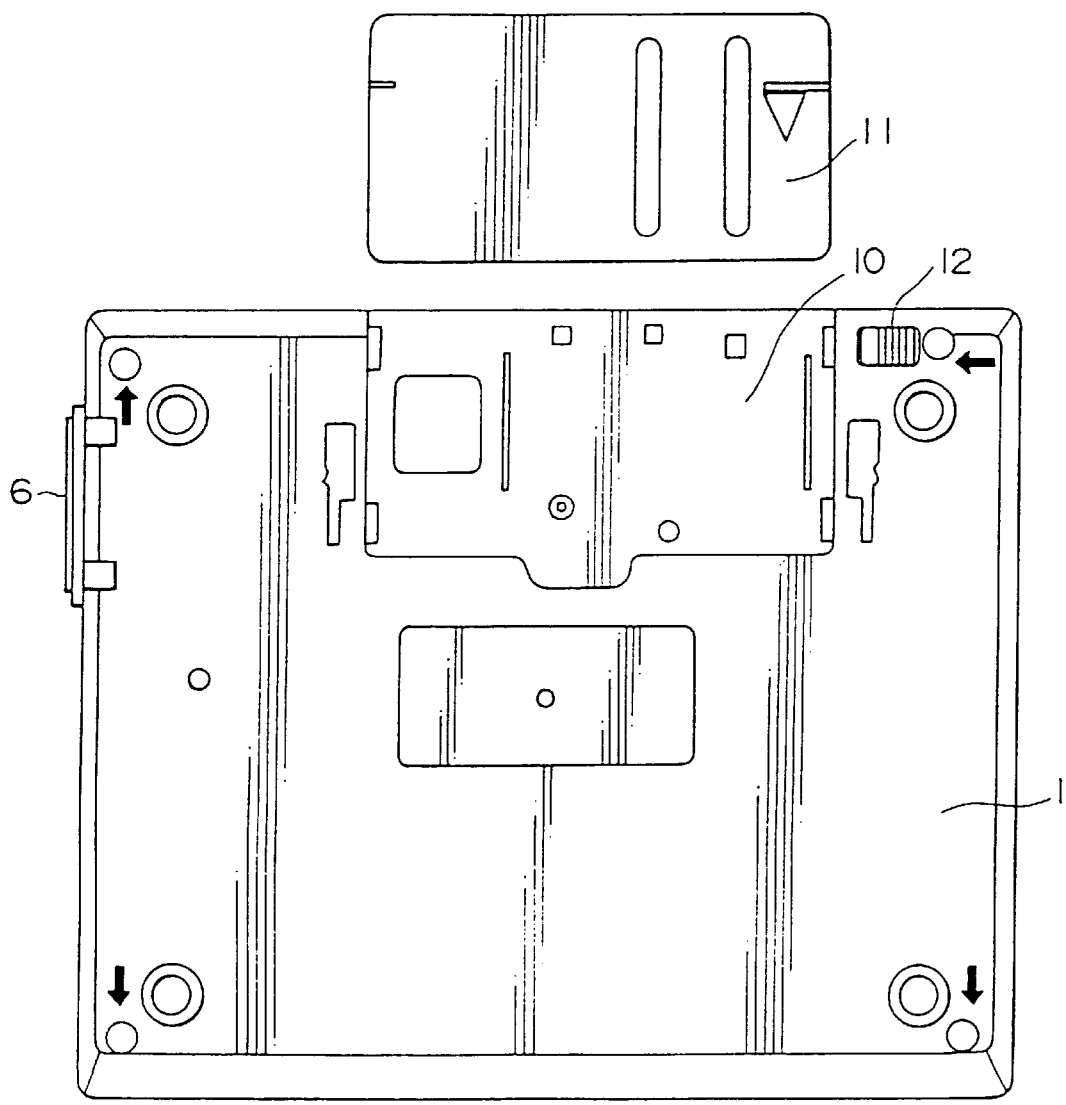
FIG. 4 is a bottom plan view of the CD-ROM reproducing apparatus of FIG. 1.

Referring to FIG. 4, a hole 10 for accommodating a battery 11 therein is formed on the bottom of the body 1. The hole 10 is closed with the battery 11 when the battery 11 is accommodated therein. The battery 11 is locked when it is accommodated into the hole 10, and when a slide button 12 is slidably moved in the leftward direction in FIG. 4, the battery 11 is unlocked so that it can be removed from the hole 10.

Figure 5:
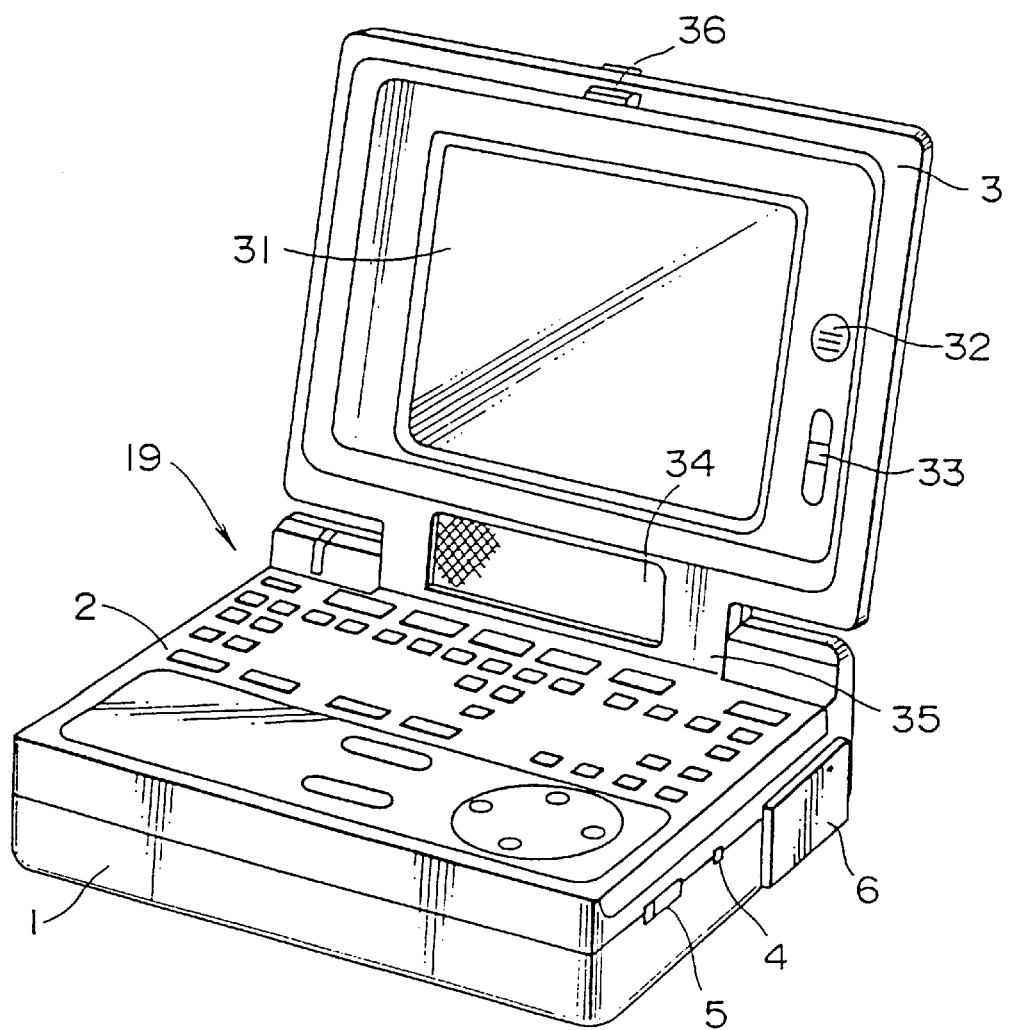
FIG. 5 is a perspective view of the CD-ROM reproducing apparatus of FIG. 1 with an outer lid opened.
Figure 6:
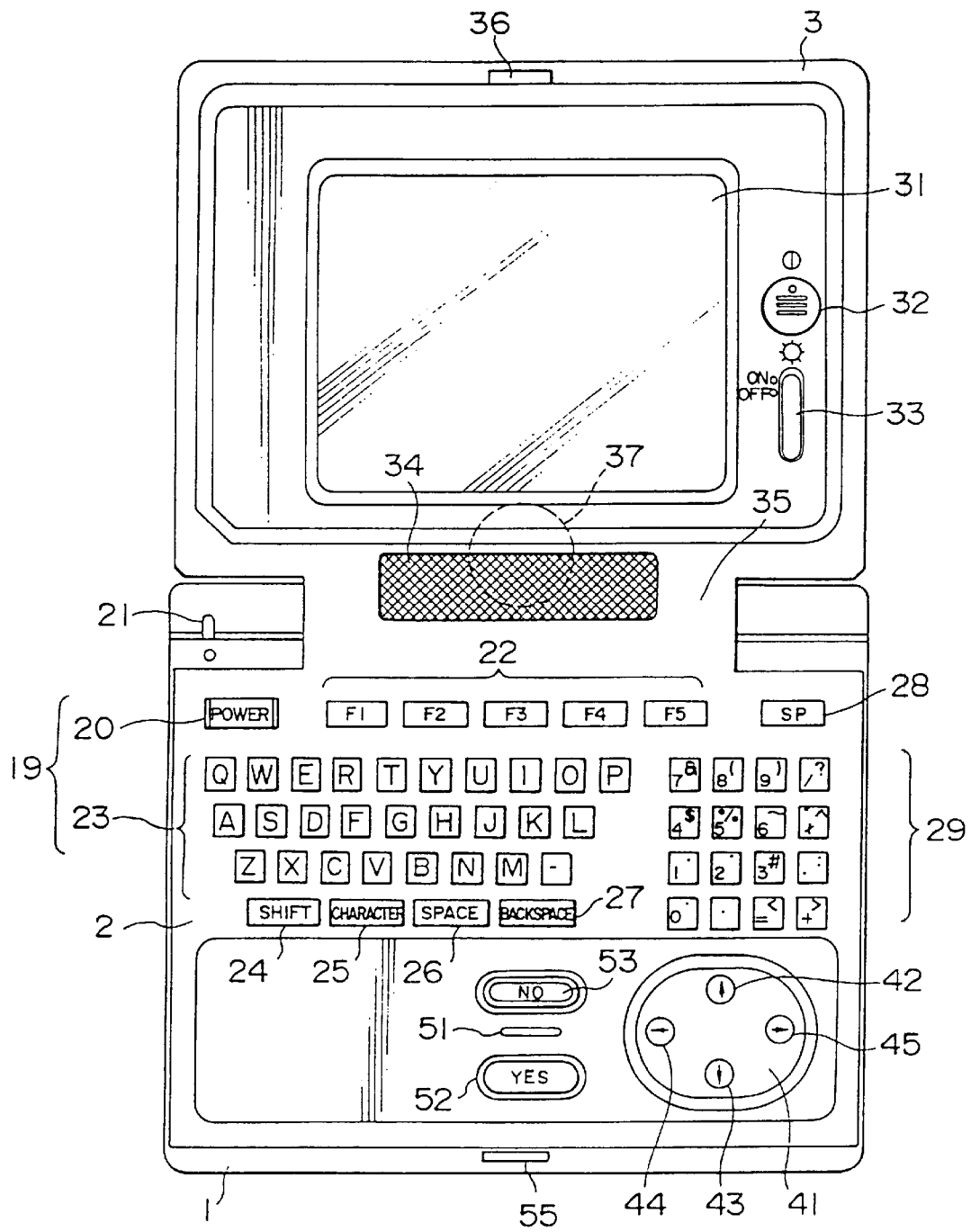
FIG. 6 is a top plan view of the CD-ROM reproducing apparatus of FIG. 1 with the outer lid opened to 180 degrees.

FIGS. 5 and 6 show an appearance of the CD-ROM reproducing apparatus when the outer lid 3 is open with respect to the body 1. When the outer lid 3 is pivoted relative to the body 1 as shown in FIG. 5, the inner lid 2 is exposed outside. A keyboard having various operation buttons 19 thereon is formed on an upper face of the inner lid 2. The operation buttons 19 are shown in detail in FIG. 6. A power source switch 20 is provided at a left upper corner portion in FIG. 6 of the inner lid 2 and is manually operated when power is to be made available or cut. When the power source switch 20 is manually operated to make power available, a power source lamp 21 provided at a left upper corner portion in FIG. 6 of the upper face of the body 1 is lit. The power source lamp 21 is extinguished when power is cut. On the other hand, when the voltage of the battery 11 becomes lower than a predetermined reference level while dc power is not supplied by way of the jack 8 and the CD-ROM reproducing apparatus is operating with the battery 11, the power source lamp 21 flickers. The power source lamp 21 is disposed so that its lit condition can be visually observed when the outer lid 3 is in any of its open condition and closed condition.

Five function keys (F1 to F5) 22 are provided on the right-hand side of the power source button 20, and when any one of the function keys 22 is manually operated, an operation allocated to it is executed. Character keys 23 for inputting alphabetical characters are disposed on the left-hand side of a middle portion of the inner lid 2. A shift (SHIFT) key 24, a character (CHARACTER) key 25, a space (SPACE) key 26 and a backspace (BACKSPACE) key 27 are provided on the lower side in FIG. 6 of the character keys 23. The shift key 24 is manually operated, when, for example, an alphabetical character of a capital letter is to be inputted, together with a character key 23 of the character. The space key 26 is manually operated when a space is to be inserted. The backspace key 27 is manually operated when a character displayed on the left-hand side of a cursor on a display section 31 which will be hereinafter described is to be deleted. The character key 25 is manually operated, when, for example, a character having an umlaut mark as in the German language is to be inputted, together with a character key 23 of the character.

Ten keys 29 are provided on the right-hand side in FIG. 6 of the character keys 23 and selectively operated manually when a numeral is to be inputted. A special (SP) key 28 is provided on the upper side in FIG. 6 of the ten keys 29. The special key 28 is manually operated when a changing program is to be rendered operative so as to selectively change the input mode to any one of an English input mode, a German input mode and a French input mode or to selectively change the time at which power is to be automatically cut.

A cursor operation plate 41 is provided on the lower side in FIG. 6 of the ten keys 29, and arrow marks 42 to 45 are displayed at upper, lower, left and right portions of the operation plate 41. When the operation plate 41 is depressed at any of the displayed portions of the arrow marks 42 to 45, the displayed position of the cursor is moved upwardly, downwardly, leftwardly or rightwardly accordingly. A substantially linear rib 51 is formed on the left-hand side in FIG. 6 of the operation plate 41, and a NO key 53 and a YES key 52 are provided on the upper and lower sides, in FIG. 6, of the rib 51. For example, with the fore finger, the thumb and the middle finger placed at the rib 51, the YES key 52 and the NO key 53, respectively, the keys 52 and 53 can be operated with certainty without looking at the keys. Further, in order to allow the YES key 52 and the NO key 53 to be identified from each other only by touching with the keys with fingers, the YES key 52 has a surface formed in a convex profile while the NO key 53 has a surface formed in a concave profile.

The YES key 52 or the NO key 53 is manually operated when a positive response or a negative response is to be inputted. The YES key 52 and the NO key 53 correspond to an enter key and an escape key (not shown) of common personal computers and have the same key codes (0DH and 1BH) as those of the enter key and the escape key allocated thereto.

A display section 31 is formed substantially at a middle location of an inner face of the outer lid 3 and includes an LCD (liquid crystal display) 100 (refer to FIG. 9) of 320× 200 dots. The display section 31 displays thereon an image reproduced from a CD-ROM 66 or characters, numerals and some other symbols inputted by way of manual operation of the character keys 23 and/or the ten keys 29. A knob 32 is provided on the right-hand side in FIG. 6 of the display section 31 and is manually turned in the clockwise direction or the counterclockwise direction when the contrast of the display section 31 is to be adjusted. A slide button 33 is provided on the lower side in FIG. 6 of the knob 32 and is slidably moved upwardly or downwardly in FIG. 6 when a backlight (not shown) disposed in the inside of the display section 31 (on the rear side of the LCD 100) is to be turned on or off.

The outer lid 3 is coupled at a coupling portion 35 thereof to the body 1, and a sound discharging section 34 is provided on a face of the coupling portion 35 of the outer lid 3 which opposes the body 1, that is, the inner lid 2. A loudspeaker 37 is disposed in the inside of the sound discharging section 37. Since the loudspeaker 37 (sound discharging section 34) is disposed in a same plane as the display section 31, it is directed in the same direction as the display section 31. Accordingly, compared with an alternative arrangement wherein the loudspeaker 37 is disposed, for example, on a side face of the outer lid 3, the user, which uses the CD-ROM reproducing apparatus while observing the display section 31, can identify sound outputted from the loudspeaker 37 more easily.

Figure 7:
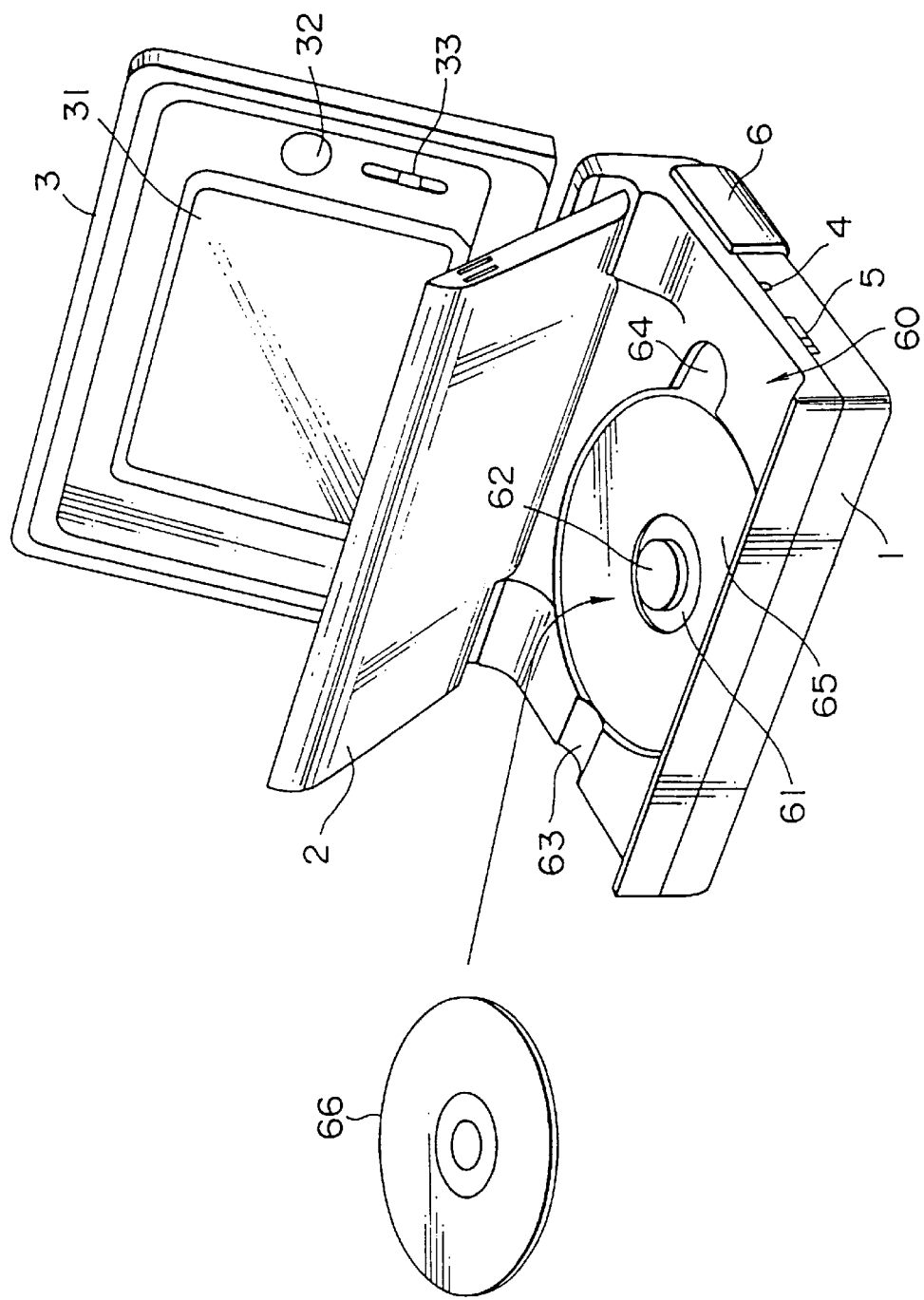
FIG. 7 is a perspective view of the CD-ROM reproducing apparatus of FIG. 1 with the outer lid and an inner lid opened.

A hook 36 is formed at an end (upper side in FIG. 6) of the inner face of the outer lid 3 so that, when the outer lid 3 is closed, it is locked at the hook 36 thereof by a locking portion 55 of the body 1. FIG. 7 shows the apparatus with the inner lid 2 open while FIG. 8 shows the apparatus with the outer lid 3 and the inner 2 removed from the body 1.

When the outer lid 3 is pivoted relative to the body 1 to an open position and then the inner lid 3 is pivoted relative to the body 1 to an open position as shown in FIG. 7, a loading section 60 for a CD-ROM 66 formed at an upper portion of the body 1 is exposed to the outside. A turntable 61 is disposed at the center of the loading section 60, and a chucking member 62 is formed at the center of the turntable 61. When a CD-ROM 61 is to be reproduced, it will be placed onto the turntable 61, and thereupon, the CD-ROM 61 is fixed to the turntable 61 by the chucking member 62. Consequently, even if the turntable 61 is rotated at a high speed, the CD-ROM 66 is prevented from being removed from the turntable 61. A recess 65 having a size substantially equal to that of the CD-ROM 66 is formed around an outer periphery of the turntable 61 so that the CD-ROM 66 may rotate without contacting the body 1. A pair of recesses 63 and 64 are formed contiguously to the recess 65 and extend radially outwardly. An operation of placing or removing a CD-ROM 66 onto or from the turntable 61 can be performed readily by putting the fingers into the recesses 63 and 64.

Figure 8:
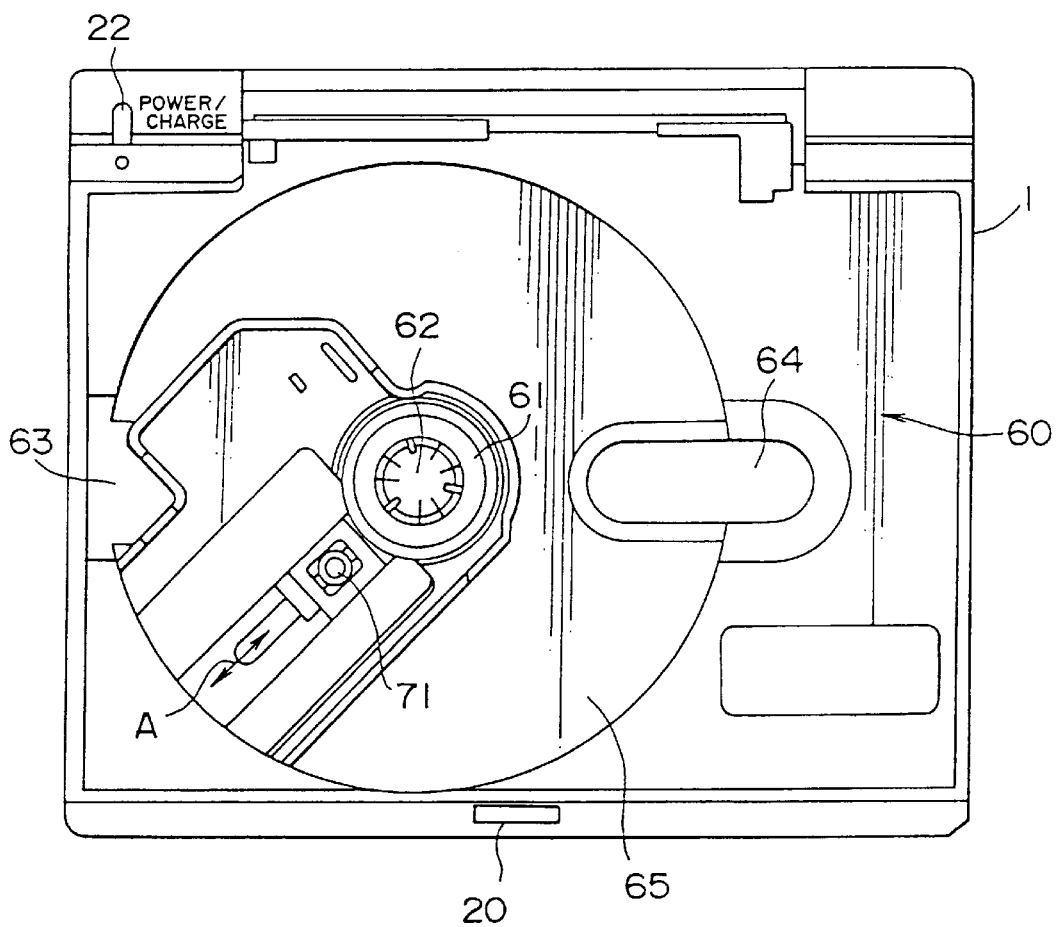
FIG. 8 is a top plan view of the CD-ROM reproducing apparatus of FIG. 1 with the outer lid and the inner lid removed.

Referring particularly to FIG. 8, an optical pickup 71 is disposed for movement in the directions indicated by a double-sided arrow mark A, that is, in radial directions of the CD-ROM 66 in the inside of the body 1. A thread motor (not shown) for feeding the optical pickup 71 in radial directions of the CD-ROM is accommodated in the inside of the body 1. The optical pickup 71 has a focusing actuator and a tracking actuator not shown so that servoing may be applied in the focusing direction and the tracking direction, respectively.

Figure 9:
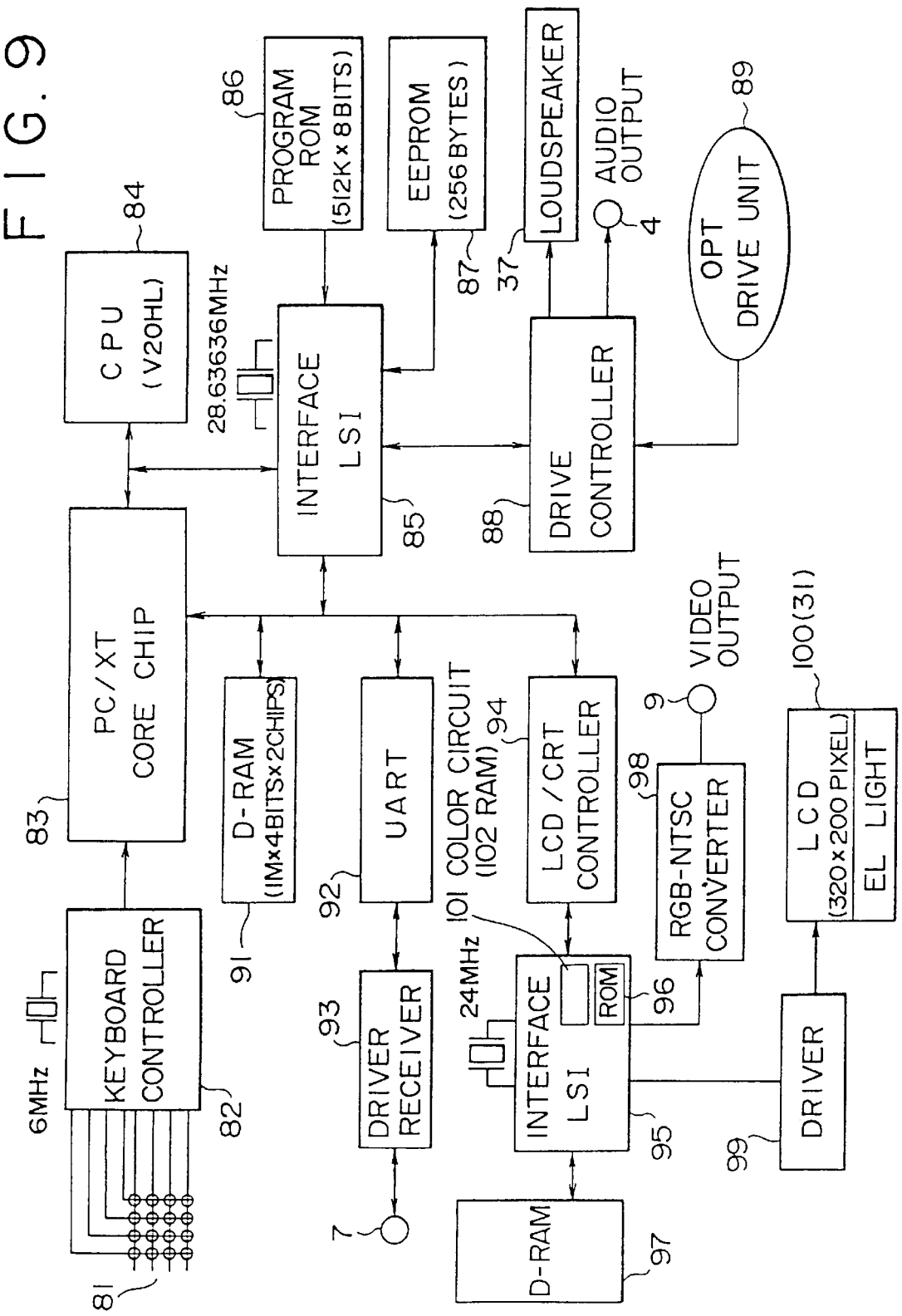
FIG. 9 is a block diagram showing an electric construction of the CD-ROM reproducing apparatus of FIG. 1.

FIG. 9 shows a construction of electric circuitry installed in the body 1. Referring to FIG. 9, a key matrix 81 detects operation of any of the operation buttons 19 on the inner lid 2 and outputs a corresponding detection signal to a keyboard controller 82 constituted from a one-chip microcomputer. The keyboard controller 82 operates with a clock signal of 6 MHz and outputs a signal corresponding to operation of an operation button 19 to a core chip 83. The core chip 83 executes processing for making a program or data supplied thereto from a CD-ROM 66 compatible with the personal computer PC/XT (trademark of IBM) by IBM. The core chip 83 is connected to a main CPU (V20HL (trademark of NEC) by NEC) 84 for controlling various components of the CD-ROM reproducing apparatus. The CPU 84 operates with a clock signal of 9.54545 MHz and is connected to a program ROM 86, an EEPROM 87 and a drive controller 88 by way of an interface LSI 85 which operates with a clock signal of 28.63636 MHz.

The program ROM 86 has prestored with it several programs necessary for operation of the CPU 84. The programs include, in addition to system programs, a changing program which is executed when the special key 28 is operated, and programs (PIEX programs which will be hereinafter described) for assuring the compatibility of programs and data between reproducing apparatus (programs) of different versions. The EEPROM 87 temporarily stores therein data which must necessarily be held even after the power supply is cut. The drive controller 88 is connected to a pickup drive unit 89 and demodulates reproduction data from the CD-ROM 66 supplied thereto from the pickup drive unit 89, outputs an audio signal from among the reproduction data to the loudspeaker 37 and the jack 4 (FIG. 2) and outputs video data from among the reproduction data to the interface LSI 85.

The interface LSI 85 is connected also to the core chip 83, a D-RAM 91 serving as a main memory, a UART (universal asynchronous receiver/transmitter) 92 and an LCD/CRT controller 94 by way of a bus so that data may be communicated to and from them. The D-RAM 91 stores therein, when necessary, data supplied thereto from the core chip 83, the interface LSI 85, the UART 92, the LCD/CRT controller 94 or the like. The UART 92 executes processing necessary for production of data conforming to the RS232C standards and outputs a result of the processing to a driver receiver 93. An output of the driver receiver 93 is outputted to the plug 7 (FIG. 2). On the other hand, RS232C data inputted by way of the plug 7 is converted into a voltage by the driver receiver 93 and inputted to the UART 92. The UART 92 converts the input data into data which can be processed by the CPU 84.

The LCD/CRT controller 94 controls operations regarding a display. In particular, the LCD/CRT controller 94 writes a video signal to be outputted to the LCD 100 or to the video output terminal 9 into a D-RAM 97 by way of an interface LSI 95. The D-RAM 97 is a video RAM in which bit map data corresponding to the display screen are developed. The interface LSI 95 has a built-in ROM 96 which which has prestored with it table which is used to change the gray scale or the color of a display image. A converter 98 converts digital RGB data for a computer outputted from the interface LSI 95 into an analog video signal of the NTSC system and outputs the analog video signal to the video output terminal 9. A driver 99 supplies monochrome video data outputted from the interface LSI 95 to the LCD 100 for display on the LCD 100. The driver 99 also controls the contrast of the LCD 100 and provides on/off control of the backlight (EL light) for the LCD 100 in response to operation of the knob 32 or the slide button 33 (FIGS. 5 and 6). The LCD 100 is provided in the display section 31 together with the backlight.

In operation, when one of the operation buttons 19 (FIG. 6) is manually operated, the key thus operated is detected by the key matrix 82, and a corresponding detection signal is inputted to the CPU 84 by way of the keyboard controller 82 and the core chip 83. The CPU 84 executes a kind of processing corresponding to an instruction from the operated key in accordance with a program stored in the program ROM 86 or the D-RAM 91.

For example, it is assumed here that reproduction of a CD-ROM 66 is instructed. In this instance, the CPU 84 controls the drive controller 88 by way of the interface LSI 85 to drive the pickup drive unit 89. The pickup drive unit 89 drives the optical pickup 72 (FIG. 8) to reproduce information written on the CD-ROM 66. The drive controller 88 demodulates a signal supplied thereto from the pickup drive unit 89. Since audio data of the CD-ROM 66 are compressed in time base, the drive controller 88 decompresses the audio data of the signal supplied thereto from the pickup drive unit 89 in time base and outputs resultant audio data to the jack 4 or to the loudspeaker 37. Consequently, an audio signal reproduced from the CD-ROM 66 can be enjoyed by way of the loudspeaker 37 or a headphone connected to the jack 4. The volume of sound then can be adjusted by manual operation of the volume button 5 (FIGS. 2 and 5). It is to be noted that, when a headphone is connected to the jack 4, supply of the audio signal to the loudspeaker 37 is stopped, but the audio signal is outputted only to the headphone.

When the audio signal is reproduced by the loudspeaker 37, the air in front of the loudspeaker 37 (outwardly of the outer lid 3) is vibrated, and also the air in the inside of the outer lid 3 in which the loudspeaker 37 is accommodated is vibrated. When the outer lid 3 is open, vibrations of the air generated outside the outer lid 3 are scattered in the open space, and consequently, they have little influence on vibrations of the air inside the body 1. Further, since the outer lid 3 is constructed separately from the body 1, there is little possibility that vibrations of the air in the inside of the outer lid 3 are transmitted as vibrations of the air in the inside of the body 1. Accordingly, the possibility that the serving mechanisms for the focusing actuator, the tracking actuator and the thread motor for driving the optical pickup 71 accommodated in the body 1 are caused to operate in error by vibrations of the air from the loudspeaker 37.

Meanwhile, video data reproduced from the CD-ROM 66 are outputted from the drive controller 88 and written once into the D-RAM 91 by way of the interface LSI 85. The data are processed by the core chip 83 when necessary so that they may be compatible with data of the personal computer PC/XT by IBM. The CPU 84 supplies and stores the video data into the D-RAM 97 by way of the LCD/CRT controller 94 and the interface LSI 95. Video data developed in the D-RAM 97 are read out by way of the interface LSI 95 by the controller 94 and outputted to and displayed on the LCD 100 (display section 31) by way of the driver 99. In this instance, the controller 94 controls, when a change of the gray scale is instructed, the interface LSI 95 so that the gray scale of picture element data is changed in accordance with the table stored in the ROM 96 and the thus changed gray scale is outputted. The gray scale control is performed by controlling the number of transmissions or interceptions of light for each picture element of the LCD 100 per unit time.

When a CRT (cathode ray tube) or a like apparatus is connected to the video output terminal 9, the controller 94 controls the driver 99 by way of the interface LSI 95 to extinguish the backlight for the LCD 100 to stop display of an image of the same. Then, video data read out from the D-RAM 96 are converted into a video signal of the NTSC system by the converter 98 and outputted to the video output terminal 9. As a result, an image based on the video data read out from the CD-ROM 66 can be monitored on the CRT of the NTSC system. It is to be noted that, in this instance, the output of an audio signal from the jack 4 or the loudspeaker 37 continues as it is.

Video data reproduced from the CD-ROM 66 are formed from 8 bits wherein the first upper 3 bits. The second upper 3 bits and the lower 2 bits are allocated to data of R, G and B, respectively, so that a total of 256 colors can be represented. The interface LSI 95 has a color circuit 101, which calculates the logical OR of data of 2 bits allocated to B and adds resulted data subsequently to the 2-bit data in order to convert the data of B into 3-bit data. Video data of a total of 9 bits wherein 3 bits are allocated to each of R, G and B are thus outputted to the converter 98.

When the interface LSI 95 has a color lookup table (CLUT) which will be hereinafter described, a RAM 102 serving as such color lookup table is provided in place of the color circuit 101. In this instance, the interface LSI 95 converts data of 8 bits read out from the D-RAM 97 into data of 18 bits (6 bits for each of R, G and B) or data of 24 bits (8 bits for each of R, G and B) and outputs the data of 18 or 24 bits to the converter 98.

Audio data, video data or text data are converted into RS232C data by the UART 92 and outputted by way of the driver receiver 93 from the plug 7 when necessary.

Figure 10:
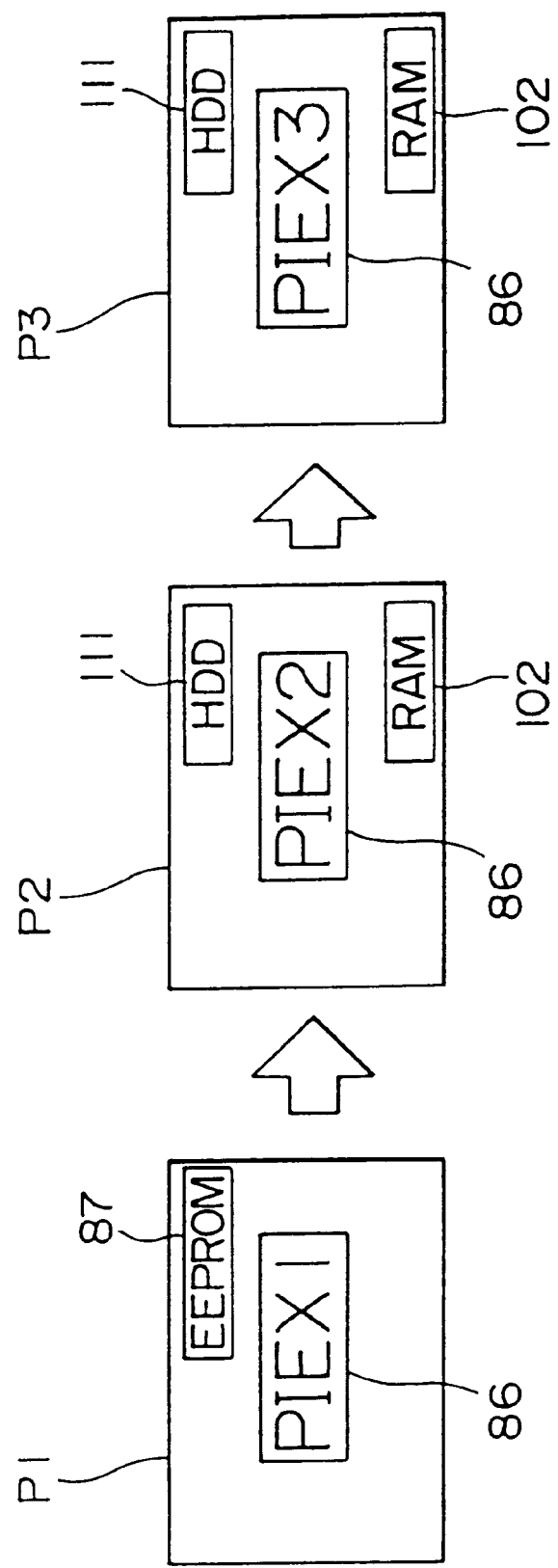
FIG. 10 is a diagrammatic view illustrating different models and matching programs PIEX.

A mutual relationship between different models having different functions, which is a premise of the present information processing system, will be described below with reference to FIG. 10. FIG. 10 illustrates a change of models. In particular, it is assumed that a preceding apparatus P1 was developed first, and then a next apparatus P2 having additional functions to those of the preceding apparatus P1 was developed, whereafter a further apparatus P3 was developed as a succeeding model to the apparatus P2.

It is further assumed that, for example, while the apparatus P1 includes the EEPROM (electrically erasable programmable non-volatile memory) 87 of 256 bytes shown in FIG. 9. the apparatus P2 does not include such an EEPROM but includes a hard disk drive (HDD) 111 of 32 megabytes instead.

In each of the apparatuses P1, P2 and P3, an extension device driver, that is, an emulation program, referred to hereinafter as a "matching program", PIEX1, PIEX2 or PIEX3, for exclusive use is stored in the built-in program ROM 86, respectively. In the matching programs PIEX1, PIEX2 and PIEX3, information regarding matters (which will be hereinafter described) for which matching is necessary in order to assure the compatibility with the other models is set in advance.

Figure 11:
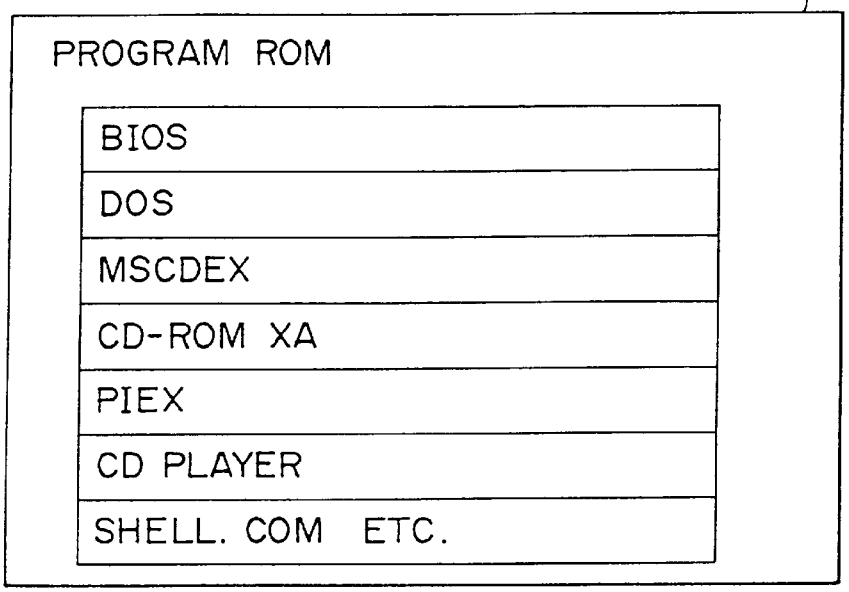
FIG. 11 is a diagrammatic view illustrating programs stored in a program ROM shown in FIG. 9.

FIG. 11 illustrates an example of the construction of programs stored in the program ROM 86 in the apparatus P1 to P3. In the construction shown, a BIOS and a DOS are adopted as system programs. The DOS employed here is the ROM-DOS of the MS-DOS (trademark of Microsoft). In addition, a program CD-ROMXA for driving, from among various CD-ROMS, a CD-ROM of the XA standards and an MSCDEX for performing a function of an interface between the programs CD-ROMXA and MS-DOS are prepared in the stored programs. Also a program CD PLAYER for reproducing an ordinary CD (CD-DA) for music is prepared. A program SHELL.COM is prepared to perform a discrimination of a CD of a different type as hereinafter described. Though not shown, proportional fonts, device drivers and various files are stored in the program ROM 86.

The matching programs PIEX are prepared in different versions for the individual apparatus P1 to P3.

Figure 12:
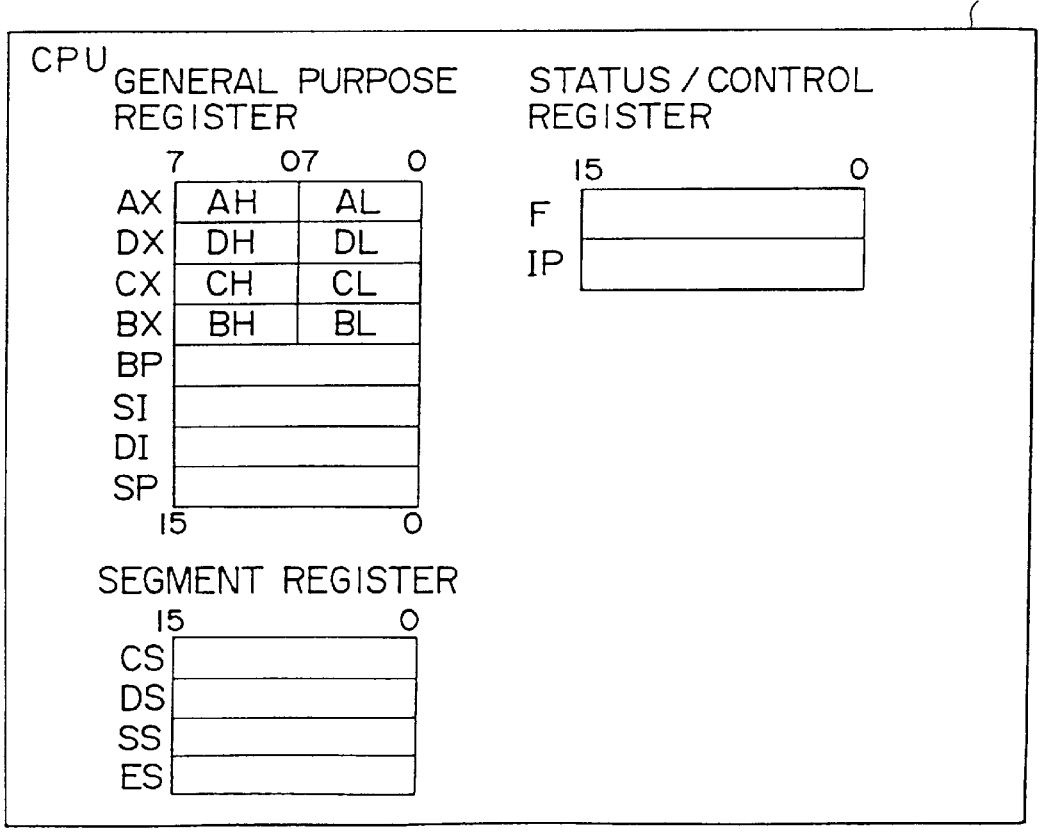
FIG. 12 is a diagrammatic view showing registers of a CPU shown in FIG. 9.

The CPU 84 has various registers as shown in FIG. 12 in order to execute processing of various programs. Referring to FIG. 12, general purpose registers include registers AX, DX, CX, BX, BP, SI, DI and SP each having the capacity of 16 bits. The registers AX, DX, CX and BX are each formed from a pair of registers AH and AL, DH and DL, CH and CL, or BH and BL for upper and lower 8 bits, respectively. Segment registers include registers CS, DS, SS and ES in which data of 16 bits can be stored. Further, status control registers include registers F and IP.

In the present information processing system, application programs to be executed on the apparatus P1, P2 and P3, that is, CD-ROMs which can be reproduced by the apparatus, are prescribed so that a file of a program EXEME.EXE or EXEME.COM must be run first. Initializing processing of any of the matching programs PIEX is started by running the program EXEME.EXE or EXEME.COM so that matching between different models, that is, between a preceding model and a succeeding model or between a host model and a slave model, may be established.

An example of construction of the matching programs PIEX will be described below. Each of the matching programs PIEX is constituted from the following 10 blocks or services:

Service 00h: Version/Peripheral
Service 01h: Display
Service 02h: Proportional Font Manager
Service 03h: Reserved
Service 04h: Scratchpad Memory
Service 05h: International Character Input
Service 06h: Timer
Service 07h: Power
Service 08h: Supplementary Character Input by Menu
Service 09h: Special Key Contents of the blocks described above will be described below.

1. Service 00h: Version/Peripheral

The present block includes the following six sub-services:

Sub-service 00h: Get Version of the Player The sub-service gets the ID of the apparatus body. The ID includes, in addition to the ID (machine ID) of the apparatus body, the version of the relevant matching program PIEX (for example, the program PIEX1, PIEX2 or PIEX3 in FIG. 10). When the service number 00h and the sub-service number 00h are placed into the registers AH and AL of the CPU 84, processing of the sub-service number is executed so that the machine ID number, the version number of the relevant matching program PIEX and information of an identification between a player and a PC emulator are outputted to the registers AX, BX and CX, respectively. The processing is described in the following manner.

| Input | AH | 00h Service number |
|---|---|---|
| | AL | 00h Sub-service number |
| OUTPUT | AX | Machine ID number |
| | BX | Version number |
| | CX | Information of "player" or "PC emulator" |
| Sub-service 01h: Get Peripheral Information | | |

The present sub-service gets information of the configuration of the system such as, for example, an RS232C cable is connected or a hard disk drive is connected to the apparatus. When the service number 00h and the sub-service number 01h are placed into the registers AH and AL, respectively, information of a peripheral or peripherals connected to the apparatus are outputted to the registers AX, BX, CX and DX as described below:

| Input | AH | 00h Service number |
|---|---|---|
| | AL | 01h Sub-service number |
| Output | AX | Peripheral information |
| | BX | Peripheral information |
| | CX | Peripheral information |
| | DX | Peripheral information |
| Sub-service 02h: Get Memory Size | | |

The present sub-service gets the size of a main memory (D-RAM 91). When the service number 00h and the sub-service number 02h are placed into the registers AH and AL, respectively, a memory size is outputted to the register AX.

| Input | AH | 00h Service number |
| --- | --- | --- |
| | AL | 02h Sub-service number |
| Output | AX | Memory size |
| Sub-service 03h: Check If Application Runs Normally | | |

An ID is applied to every application program which can be used in the present apparatus. It is determined from the ID whether or not the application program can be used on the apparatus. When the service number 00h and the sub-service number 03h are placed into the registers AH and AL, respectively, and then the application ID is inputted to the registers BX and CX, 0 or some other information is outputted to the register AX.

| Input | AH | 00h Service number |
| --- | --- | --- |
| | AL | 03h Sub-service number |
| | BX:CX | Application ID |
| Output | AX = 0: | May run normally |
| | ELSE: | Will not run normally |
| Sub-service 04h: Initialize PIEX Environment | | |

The present sub-service effects initialization of the system. When the service number 00h and the sub-service number 04h are placed into the registers AH and AL, respectively, an initializing operation is executed. When the initialization has been executed normally, "0" is placed into the register AX, but when an error has occurred, "ELSE" is placed into the register AX.

| Input | AH 00h | Service number |
| --- | --- | --- |
| | AL 04h | Sub-service number |
| Output | AX = 0: | Initialized |
| | ELSE: | Error |
| Sub-service 05: Terminate PIEX | | |

The system is reset into a state before its initialization by the processing. When the service number 00h and the sub-service number 05h are placed into the registers AH and AL, respectively, processing for resetting the system into a state before its initialization is executed, and when the processing has been executed normally, "0" is placed into the register AX, but when an error has occurred, some other value is placed into the register AX.

| Input | AH 00h | Service number |
| --- | --- | --- |
| | AL 05h | Sub-service number |
| Output | AX = 0: | Terminated |
| | ELSE: | Error |

2. Service 01h: Display

The present service or block includes the following five sub-services.

Sub-service 00h: Set Color Mode

The processing sets whether the output is color or monochrome. The service number 01h and the sub-service number 00h are placed into the registers AH and AL, respectively, and then, when it is desired to display in a color mode, "0" is placed into the register BL, but when it is desired to display in a monochrome mode, "1" is placed into the register BL. As a result of such setting, the CPU 84 controls the controller 94 to execute color display or monochrome display corresponding to the set data.

| Input | AH 01h | Service number |
| --- | --- | --- |
| | AL 00h | Sub-service number |
| | BL = 0: | Color mode |
| | 1: | Monochrome mode |
| Output | None | |
| Sub-service 01h: Get Color Mode | | |

The sub-service gets information whether the current output is color or monochrome. In particular, if the service number 01h and the sub-service number 01h are placed into the registers AH and AL, respectively, then when the current mode is a color mode, "0" is outputted to the register BL, but when the current mode is a monochrome mode, "1" is outputted.

| Input | AH 01h | Service number |
| --- | --- | --- |
| | AL 01h | Sub-service number |
| Output | BL = 0: | Color mode |
| | 1: | Monochrome mode |
| Sub-service 02h: Set LCD 7 Gray Scale Conversion Table | | |

In the embodiment described above, since the LCD 100 can make only a monochrome display, when color video data of R, G and B are to be supplied to the LCD 100, each of them is converted into a monochrome signal of a gray scale of seven levels. The present service selects a conversion table of the ROM 96 in accordance with which it is determined into which one of the seven levels of the gray scale data should be converted. For example, four conversion tables are prepared as such conversion tables, and one of the four conversion tables is selected. In particular, if the service number 01h and the sub-service number 02h are placed into the registers AH and AL. respectively, and then a predetermined value is inputted to the register BL, then a designated one of the four tables is thereafter used. When the value set to the register BL is 0, the table for normal use is selected, but when the value set is 1, 2 or 3, the table for setting a low, medium or high degree of enhancement is selected.

| Input | AH 01h | Service number |
| --- | --- | --- |
| | AL 02h | Sub-service number |
| | BL = 0: | Normal (default) |
| | = 1: | Enhance 1 (low) |
| | = 2: | Enhance 2 (medium) |
| | = 3: | Enhance 3 (high) |
| Output | None | |
| Sub-service 03h: Get LCD Conversion Table | | |

The sub-service gets the number of the gray scale conversion table being currently selected. If the present service is selected, then the kind of the table being currently selected is outputted.

| | | |
|---|---|---|
| Input | AH 01h | Service number |
| | AL 03h | Sub-service number |
| Output | AL = 0: | Normal (default) |
| | = 1: | Enhance 1 (low) |
| | = 2: | Enhance 2 (medium) |
| | = 3: | Enhance 3 (high) |

3. Service 02h: Proportional Font Manager

Sub-service 00h: Select Font

The sub-service selects a font. If the service is designated into the registers AH and AL and then the number of a font is designated into the register BL and the address of the font registered by the user is designated into the registers ES and DI, then the CPU 84 executes processing so as to use the designated font. When the processing has been executed normally, "0" is outputted to the register AX. but when the system font number is abnormal or the user defined font data is abnormal, the value "1" or "2" is outputted.

| | | |
|---|---|---|
| Input | AH 02h | Service number |
| | AL 00h | Sub-service number |
| | BL | Font number (OFFh = user defined font) |
| | ES:DI | Starting address of user defined font |
| Output | AX = 0: | Exit successfully |
| | = 1: | No such system font |
| | = 2: | User defined font data is illegal |
| Sub-service 01h: Get Current Font | | |

The sub-service gets the number of the current font number. If the service is designated into the registers AH and AL, then the number of the font is outputted to the register BL and the height of the font is outputted to the register BH. Further, the ascent of the font (the height of a character, which is displayed with part thereof projected downwardly from a predetermined reference line, such as, for example, the character "q", from the reference line) is outputted to the register CL, and the address of the user defined font is outputted to the registers ES and DI. Further, the starting address of the name of the user defined font is outputted to the register ES and SI.

| | | |
|---|---|---|
| Input | AH | 02h Service number |
| | AL | 01h Sub-service number |
| Output | BL | Font number (OFFh = user defined font) |
| | BH | Height of font |
| | CL | Ascent of font |
| | ES:DI | Starting address of user defined font |
| | ES:DI | Starting address of name of user defined address |
| Sub-service 02h: Set Virtual Screen Address | | |

The sub-service sets the address of the output screen. The service is designated into the registers AH and AL, and then the address of the virtual screen is designated into the registers ES and DI. In this instance, the CPU 84 sets the starting address of the output screen to the designated screen.

| | | |
|---|---|---|
| Input | AH | 02h Service number |
| | AL | 02h Sub-service number |
| | ES:DI | Starting address of virtual screen |
| Output | None | |
| Sub-service 03h: Get Virtual Screen Address | | |

The sub-service gets the address of the current output screen. If the service is designated into the registers AH and AL. then the address of the virtual screen is outputted to the registers ES and DI.

| | | |
|---|---|---|
| Input | AH | 02h Service number |
| | AL | 03h Sub-service number |
| Output | ES:DI | Starting address of virtual screen |
| Sub-service 04h: Set Display Color | | |

The sub-service selects a color. The service is specified into the registers AH and AL, and then the foreground and background colors are designated into the registers CX and BX, respectively.

| | | |
|---|---|---|
| Input | AH | 02h Service number |
| | AL | 04h Sub-service number |
| | CX | Foreground color |
| | BX | Background color |
| Output | None | |
| Sub-service 05h: Get Display Color | | |

The sub-service gets the current output color. If the service is designated into the registers AH and AL, then the foreground and background colors are outputted to the registers CX and BX.

| | | |
|---|---|---|
| Input | AH | 02h Service number |
| | AL | 05h Sub-service number |
| Output | CX | Foreground color |
| | BX | Background color |
| Sub-service 06h: Set Display Attributes | | |

The sub-service sets the attributes of the character to be displayed and is used when, for example, an underline or an inclined character (Italics) is used. If the service is designated into the registers AH and AL, then the attributes of the character are designated into the register BX.

| | | | |
|---|---|---|---|
| Input | AH | 02h | Service number |
| | AL | 06h | Sub-service number |
| | BX | | Display attributes |
| Output | None | | |
| Sub-service | | 07h: | Get Current Display Attributes |

The service gets the attributes of the character being displayed currently, and if the service is designated into the registers AH and AL, then information of the attributes of the character is outputted to the register BX.

| Input | AH | 02h | Service number |
|---|---|---|---|
| | AL | 07h | Sub-service number |
| Output | BX | | Attributes |
| Sub-service | | 08h: | Output A Character |

The sub-service outputs a character. The service is designated into the registers AH and AL, and then the code of a character is designated into the register BL and the X coordinate and the Y coordinate are designated into the registers CX and DX, respectively. The X coordinate has a value ranging from 0 to 319 both inclusive, and the Y coordinate has a value ranging from 0 to 199 both inclusive. If such inputting is performed, then a character of the designated code is displayed. Then, when a normal display has been effected, 00h is outputted to the register AX, but when either of the coordinate values is abnormal, 01h is outputted, or when the video mode is abnormal, 10h is outputted.

| Input | AH | 02h | Service number |
|---|---|---|---|
| | AL | 08h | Sub-service number |
| | BL | | Character code |
| | CX | | X coordinate (0–319) |
| | DX | | Y coordinate (0–199) |
| Output | AX | = 00h: | Exit successfully |
| | | = 01h: | Illegal coordinate |
| | | = 10h: | Illegal video mode |
| Sub-service | | 09h: | Output A String (left justified) |

The sub-service outputs a character string in a left justified condition. The service is designated into the registers AH and AL, and then the X coordinate and the Y coordinate are designated into the registers CX and DX, respectively. Further, the starting address of an output string is designated into the registers DS and SI. If such inputting is performed, then a character string is displayed in a left justified condition. When a normal display has been effected, 00h is outputted to the register AX. but when either of the coordinate values is abnormal, 01h is outputted, or when the video mode is abnormal, 10h is outputted.

| Input | AH | 02h | Service number |
|---|---|---|---|
| | AL | 09h | Sub-service number |
| | CX | | X coordinate (0–319) |
| | DX | | Y coordinate (0–199) |
| | DS:SI | | Starting address of output string |
| Output | AX | = 00h: | Exit successfully |
| | | = 01h: | Illegal coordinate |
| | | = 10h: | Illegal video mode |
| Sub-service | | 0Ah: | Output A String (right justified) |

The sub-service outputs a character string in a right justified condition. The service is designated into the registers AH and AL, and then the X coordinate and the Y coordinate are designated into the registers CX and DX, respectively. Further, the starting address of an output string is designated into the registers DS and SI. If such designation is performed, then a character string is displayed in a right justified condition. When a normal display has been effected, 00h is outputted to the register AX, but when either of the coordinate values is abnormal, 01h is outputted, or when the video mode is abnormal, 10h is outputted.

| Input | AH | 02h | Service number |
|---|---|---|---|
| | AL | 0Ah | Sub-service number |
| | CX | | X coordinate (0–319) |
| | DX | | Y coordinate (0–199) |
| | DS:SI | | Starting address of output string |
| Output | AX | = 00h: | Exit successfully |
| | | = 01h: | Illegal coordinate |
| | | = 10h: | Illegal video mode |
| Sub-service | | 0Bh: | Output A String (centered) |

The sub-service outputs a character string in a centered condition. If the service is designated into the registers AH and AL and then inputting similar to that for outputting of a character string in a left or right justified condition is performed into the registers BX, CX, DX, DS and SI (in this instance, the X coordinate and the Y coordinate are left and upper coordinates, respectively), then a character string is displayed in a centered condition. When a normal display has been effected, 00h is outputted to the register AX, but when either of the coordinate values is abnormal, 01h is outputted, or when the width of the character string is excessively great, 02h is outputted, or else, when the video mode is abnormal, 10h is outputted.

| Input | AH | 02h | Service number |
|---|---|---|---|
| | AL | 0Bh | Sub-service number |
| | BX | | X coordinate (left) |
| | CX | | Width of output string |
| | DX | | Y coordinate (upper) |
| | DS:SI | | Starting address of output string |
| Output | AX | = 00h: | Exit successfully |
| | | = 01h: | Illegal coordinate |
| | | = 02h: | String width too large |
| | | = 10h: | Illegal video mode |
| Sub-service | | 0Ch: | Output A String (justified) |

The sub-service outputs a character string in a left and right justified condition. If the service is designated into the registers AH and AL and then inputting similar to that for outputting of a character string in a centered condition is performed into the registers BX, CX, DX, DS and SI, then a character string is displayed in a justified condition at the left and right ends thereof. A similar value to that when a string is displayed in a centered condition is outputted to the register AX.

| Input | AH | 02h | Service number |
|---|---|---|---|
| | AL | 0Ch | Sub-service number |
| | BX | | X coordinate (left) |
| | CX | | Width of output string |
| | DX | | Y coordinate (upper) |
| | DS:SI | | Starting address of output string |
| Output | AX | = 00h: | Exit successfully |
| | | = 01h: | Illegal coordinate |
| | | = 02h: | String width too large |
| | | = 10h: | Illegal video mode |
| Sub-service | | 0Dh: | Delete A Character |

The sub-service deletes a character. If the service is designated into the registers AH and AL and then the code of a character is inputted to the register BL and the X coordinate and the Y coordinate are inputted to the registers CX and DX, respectively, then a designated character is deleted. When the character has been deleted normally, 00h is outputted to the register AX, but when the video mode is abnormal, 10h is outputted.

| Input | AH | 02h | Service number |
|---|---|---|---|
| | AL | 0Dh | Sub-service number |
| | BL | | Character code |
| | CX | | X coordinate (0–319) |
| | DX | | Y coordinate (0–199) |
| Output | AX | = 00h: | Exit successfully |
| | | = 01h: | Illegal coordinate |
| | | = 10h: | Illegal video mode |
| Sub-service | | 0Eh: | Delete A String (Left Delete) |

The sub-service deletes a character string displayed in a left justified condition. The service is specified into the registers AH and AL, and then the X coordinate and the Y coordinate are inputted to the registers CX and DX, respectively. Further, the character string starting address is set into the registers DS and SI in preparation for calculation of the width of the character string. If such inputting is performed, then the CPU 84 deletes a displayed character string with reference to the left end. When normal deletion has been performed, 00h is outputted to the register AX, but when the coordinate is abnormal, 01h is outputted, or when the video mode is abnormal, 10h is outputted.

| Input | AH | 02h | Service number |
|---|---|---|---|
| | AL | 0Eh | Sub-service number |
| | CX | | X coordinate (0–319) |
| | DX | | Y coordinate (0–199) |
| | DS:SI | | Starting address of output string (for calculation of width of string) |
| Output | AX | = 00h: | Exit successfully |
| | | = 01h: | Illegal coordinate |
| | | = 10h: | Illegal video mode |
| Sub-service | | 0Fh: | Delete A String (Right Delete) |

The sub-service deletes a character string displayed in a right justified condition. When the present service is designated, the CPU 84 deletes a character string displayed in a right justified condition with reference to the position of the right end of the string.

| Input | AH | 02h | Service number |
|---|---|---|---|
| | AL | 0Fh | Sub-service number |
| | | | X coordinate (0–319) |
| | DX | | Y coordinate (0–199) |
| | DS:SI | | Starting address of output string (for calculation of width of string) |
| Output | AX | = 00h: | Exit successfully |
| | | = 01h: | Illegal coordinate |
| | | = 10h: | Illegal video mode |
| Sub-service | | 10h: | Clear Rectangle Area 1 |

The sub-service deletes a rectangular range of the height of a character string displayed and a designated width. The service is specified into the registers AH and AL, and then the X coordinate and the Y coordinate are inputted to the registers BX and DX, respectively, and a width of the rectangle is designated into the register CX. If such designation is performed, then the rectangular range of the height of a character string and the designated width is deleted. The output upon normal deletion or in the case of an abnormal coordinate or an abnormal video mode to the register AX is similar to that when a character string is to be deleted.

| Input | AH | 02h | Service number |
|---|---|---|---|
| | AL | 10h | Sub-service number |
| | BX | | X coordinate (0–319) |
| | CX | | Width of rectangle |
| | DX | | Y coordinate (0–199) |
| Output | AX | = 00h: | Exit successfully |
| | | = 01h: | Illegal coordinate |
| | | = 10h: | Illegal video mode |
| Sub-service | | 11h: | Clear Rectangle Area 2 |

The sub-service deletes an arbitrarily designated rectangular range. Data specifying the service are inputted to the registers AH and AL, and then the X coordinate and the Y coordinate are inputted to the registers BX and DX, respectively. Then, a width and a height of the rectangle are inputted to the register CX and SI, respectively. If such designation is performed, then the display of the range of the designated rectangle is deleted. The output to the register AX is similar to that in the sub-service 10h of the service 02h.

| Input | AH | 02h | Service number |
|---|---|---|---|
| | AL | 11h | Sub-service number |
| | BX | | X coordinate |
| | CX | | Width of rectangle |
| | DX | | Y coordinate |
| | SI | | Length of rectangle |
| Output | AX | = 00h: | Exit successfully |
| | | = 01h: | Illegal coordinate |
| | | = 10h: | Illegal video mode |
| Sub-service | | 12h: | Get Character Size |

The sub-service gets the size of a character. If the service is specified into the registers AH and AL and then the code of a character is inputted to the register BL, the width of the designated character is outputted to the register CX.

| Input | AH | 02h | Service number |
|---|---|---|---|
| | AL | 12h | Sub-service number |
| | BL | | Character code |
| Output | CX | | Character width |
| Sub-service | | 13h: | Get String Size |

The sub-service gets the length of a character string. If the service is specified into the registers AH and AL and then the starting address of a character string is designated into the registers DS and SI, then the length of the character string is outputted to the register CX.

| Input | AH | 02h | Service number |
|---|---|---|---|
| | AL | 13h | Sub-service number |
| | DS:SI | | Starting address of character string |
| Output | CX | | Length of character string |
| Sub-service | | 14h: | Get the Number of Characters |

The sub-service gets the number of characters which can be written into a designated length. If the service is specified into the registers AH and AL and then the write width is designated into the register CX and the starting address of a character string is designated into the registers DS and SI, then the number of characters which can be written into the designated width is outputted to the register BX.

| Input  | AH    | 02h | Service number |
|--------|-------|-----|----------------|
|        | AL    | 14h | Sub-service number |
|        | CX    |     | Write width |
|        | DS:SI |     | Starting address of character string |
| Output | BX    |     | Number of characters |

4. Service 03h: Reserved

The service is reserved for a function or functions which may be added later.

5. Service 04h: Scratchpad Memory

Figure 14:
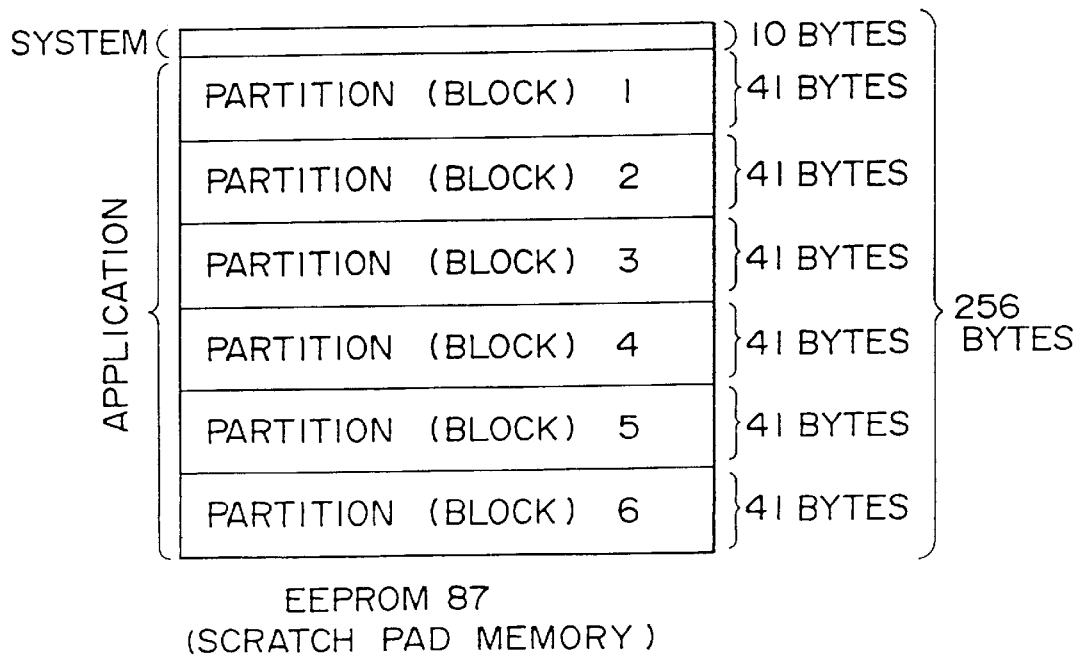
FIG. 14 is a diagrammatic view illustrating division of a memory area of an EEPROM shown in FIG. 9 when data are recorded into the EEPROM.

The present service relates to the EEPROM 87. In the service, the EEPROM 87 is used in such a manner as illustrated in FIG. 14. In particular, referring to FIG. 14, of the capacity of 256 bytes, 10 bytes are used for the system, and the remaining 246 bytes are used for an application or applications. The area of 246 bytes for use for a application is divided into 6 partitions (blocks) of 41 bytes. Each partition (block) can correspond to an application (each CD-ROM 66), and accordingly, a total of 6 applications (6 CD-ROMs) can be managed.

Each partition (block) has the following structure:

| Application ID   | 4 bytes  |
|------------------|----------|
| Application Name | 12       |
| User Data        | 24       |
| Check Sum        | 1        |
| Total            | 41 bytes |

The application ID is constituted from 32 bits, and the upper four bits of the 32 bits on the MSB side are reserved and are all equal to 0. The following 12 bits make a publisher ID. The lower 16 bits can be used arbitrarily by a publisher (who publishes the CD-ROM 66).

The EEPROM 87 can be used for a book mark function such that, for example, when a program is interrupted, the position is stored, and then when the program is to be re-started, it is started beginning with the stored position. Or else, a score of a game, a password or some other data can be stored into the EEPROM 87.

The following sub-services belong to the present service.

Sub-service 00h: Get Configuration of Scratchpad Memory

The sub-service gets a status of the EEPROM 87. If the service is designated into the registers AH and AL, then the number of data blocks is outputted to the register BX and the size of the user data area is outputted to the register CX.

| Input       | AH | 04h | Service number |
|-------------|----|-----|----------------|
|             | AL | 00h | Sub-service number |
| Output      | BX |     | Number of data blocks |
|             | CX |     | Size of user data area |
| Sub-service |    | 01h: | Get Number of Unused Application Area Blocks |

The sub-service gets the number of unused data blocks. If the service is designated into the registers AH and AL, then the number of unused data blocks is outputted to the register BX.

| Input       | AH | 04h | Service number |
|-------------|----|-----|----------------|
|             | AL | 01h | Sub-service number |
| Output      | BX |     | Number of unused data blocks |
| Sub-service |    | 02h: | Write Data |

The sub-service writes data into the EEPROM 87. If the service is designated into the registers AH and AL: an application ID is set into the registers BX and CX; the address of an application name is set into the registers DS and SI: and the address of a data buffer is designated into the registers ES and DI, then data of the designated data buffer are written into a predetermined block of the EEPROM 87. When the writing has been performed normally, 0 is outputted to the register AX, but when the data area is insufficient. 1 is outputted, or when different names are present for the same ID, 2 is outputted.

| Input  | AH    | 04h | Service number |
|--------|-------|-----|----------------|
|        | AL    | 01h | Sub-service number |
|        | BX:CX |     | Application ID (= BX * 10000h + CX) |
|        | DS:SI |     | Pointer to application name (NULL Terminated) |
|        | ES:DI |     | Data buffer pointer |
| Output | AX    | 0:  | Successful |
|        |       | 1:  | Data area insufficient |
|        |       | 2:  | Same ID but different application name exists |

It is to be noted that, since the number of characters for the name of an application is not designated specifically, data is treated as a name until the number is reduced to 0.

Sub-service 03h: Read Data

The sub-service reads out data from the EEPROM 87. The inputs to and the outputs from the registers are similar to those in writing of data in the sub-service 02h. It is to be noted that, since the present sub-service is reading, data of a designated application ID is outputted to a designated data buffer.

| Input       | AH    | 04h  | Service number |
|-------------|-------|------|----------------|
|             | AL    | 01h  | Sub-service number |
|             | BX:CX |      | Application ID (= BX * 10000h + CX) |
|             | DS:SI |      | Pointer to application name (NULL Terminated) |
|             | ES:DI |      | Data buffer pointer |
| Output      | AX    | 0:   | Successful |
|             |       | 2:   | Same ID but different application name exists |
|             |       | 3:   | No data exists |
| Sub-service |       | 04h: | Delete Data |

The sub-service deletes data written in the EEPROM 87. If the service is specified into the registers AH and AL and an application ID is designated into the registers BX and CX and then the address of an application name is designated into the registers DS and SI, then data of the designated application ID are deleted. When the deletion has been performed normally, 0 is outputted to the register AX, but different names are present for the same ID, 2 is outputted, or when no data is present, 3 is outputted.

| Input | AH | 04h | Service number |
|---|---|---|---|
| | AL | 01h | Sub-service number |
| | BX:CX | | Application ID |
| | | | (= BX * 10000h + CX) |
| | DS:SI | | Pointer to application name |
| | | | (NULL Terminated) |
| Output | AX | 0: | Successful |
| | | 2: | Same ID but different application name exists |
| | | 3: | No data exists |

When data are divided into blocks as shown in FIG. 14, it is theoretically possible to point to only an ID to delete the corresponding data. However, if such construction is employed, then the user must remember the ID of each application, which deteriorates the operability. Thus, in the present construction, as the format of each block, not only the application ID but also the application name are stored into each block as described hereinabove. Accordingly, the user can select data to be deleted readily from the name (application name).

6. Service 05h: International Character Input

The present service is used to input a European Character.

Sub-service 00h: Select Language

The sub-service selects a language to be used. If the service is designated into the registers AH and AL and one of language numbers listed below is designated into the register BX, then the language of the designated number can thereafter be used. When the designated language has been made available normally, 0 is outputted to the register AX, but the designated language is not supported, 1 is outputted.

| Input | AH | 05h | Service number |
|---|---|---|---|
| | AL | 00h | Sub-service number |
| | BX | | Language number |
| Output | AX | 0: | Successful |
| | | 1: | Designated language not supported |

Language numbers

0: U.S.A. ENGLISH (default)

1: UK ENGLISH

2: SPANISH

3: FRENCH

4: GERMAN

5: ITALIAN

6: SCANDINAVIAN

7: MULTI-LANGUAGE

Sub-service 01h: Get Current Language Number

The sub-service gets information of the language being used at present. If the service is designated into the registers AH and AL, then the number of the language being used at present is outputted to the register BX.

| Input | AH | 05h | Service number |
|---|---|---|---|
| | AL | 01h | Sub-service number |
| Output | BX | | Language number |
| Sub-service | | 02h: | Input Spring |

The sub-service inputs a string of characters. The service is designated into the registers AH and AL and the left-hand side coordinate is designated into the register BX and the Y coordinate is designated into the register SI. Further, a horizontal width is designated into the register CX and a maximum input character number is designated into the register DX. Furthermore, the starting address of an input buffer is designated into the registers ES and DI. When normal inputting has been performed, 00h is outputted to the register AX: when either coordinate has been abnormal, 01h is outputted: when the character string width is exceeded, 02h is outputted: or when the video mode is abnormal, 10h is outputted. Further, the input character number is outputted to the register DX, and the starting address of the input buffer is outputted to the registers ES and DI. Further, a terminate character code is outputted to the register BX.

| Input | AH | 05h | Service number |
|---|---|---|---|
| | AL | 02h | Sub-service number |
| | BX | | Left-hand side coordinate (0–319) |
| | CX | | Horizontal size |
| | DX | | Maximum input character number |
| | SI | | Y coordinate (0–199) |
| | ES:DI | | Starting address of input buffer |
| Output | AX | = 00h: | Successful |
| | | = 01h: | Illegal coordinate |
| | | = 02h: | Horizontal size exceeded |
| | | = 10h: | Illegal video mode |
| | DX | | Input character number |
| | ES:DI | | Starting address of input buffer (NULL terminated) |
| | BX | | Terminate character code |
| Sub-service | | 03h: | Set Character Conversion |

The sub-service sets the order of appearance of characters. If the service is designated into the registers AH and AL and the starting address of a character appearance order setting table is designated into the registers DS and SI, then the order of appearance of characters is set.

| Input | AH | 05h | Service number |
|---|---|---|---|
| | AL | 03h | Sub-service number |
| | DS:SI | | Starting address of character appearance order setting table |
| Output | None | | |
| Sub-service | | 04h: | Enable/Disable Character Key Language Setting Option on Special Key Menu |

The sub-service enables or disables a language selecting function by the special key 28. If the service is designated into the registers AH and AL and 00h is designated into the register BX, the selecting function is enabled, but if any other value than 00h is designated, the selecting function is disabled.

| Input | AH | 05h | Service number |
|---|---|---|---|
| | AL | 04h | Sub-service number |
| | BX | 00h: | Enable |
| | | Else: | Disabled |
| Output | None | | |

7. Service 06h: Timer

The present service relates to a timer.

Sub-service 00h: Clear Timer

The sub-service clears the timer to zero. If the service is designated into the registers AH and AL and 00h is designated into the register BX, the timer is cleared to zero.

| Input | AH | 06h | Service number |
|---|---|---|---|
| | AL | 00h | Sub-service number |
| Output | None | | |
| Sub-service | | 01h: | Get Timer |

The sub-service gets the time elapsed after the timer was cleared to zero last. If the service is designated into the registers AH and AL, the elapsed time is outputted to the registers BX, CX and DX.

| Input | AH | 06h | Service number |
|---|---|---|---|
| | AL | 01h | Sub-service number |
| Output | BX:CX:DX | | (BX * 100000000h + CX * 10000h + DX) Time elapsed after execution of Clear Timer |

8. Service 07h: Power

The service relates to power supply.

Sub-service 00h: Set "Power Normal/Low Status" Handling Routine

The sub-service sets a routine to be called in response to detection of a low power status. If the service is designated into the registers AH and AL and the starting address of a lower power processing routine is designated into the registers DS and DX, then when the voltage of the power supply thereafter becomes lower, the set processing routine is executed.

| Input | AH | 07h | Service number |
|---|---|---|---|
| | AL | 00h | Sub-service number |
| | DS:DX | | Pointer to lower power status processing routine |
| Output | None | | |
| Sub-service | | 01h: | Set "Power Low/Normal Status" Handling Routine |

The sub-service sets a routine for informing that the voltage of the power source has returned from a low power status to a normal status. If the service is designated into the registers AH and AL and the starting address of a power return processing routine is designated into the registers DS and DX, then when the voltage of the power supply is thereafter recovered, the set routine is executed.

| Input | AH | 07h | Service number |
|---|---|---|---|
| | AL | 01h | Sub-service number |
| | DS:DX | | Pointer to power return processing routine |
| Output | None | | |
| Sub-service 02h: Get Status of Power | | | |

The sub-service gets the status of the battery 11 at present. If the service is designated into the registers AH and AL, -then when the battery 11 is normal, 00h is outputted to the register AX, but when the voltage of the battery 11 is insufficient, 01h is outputted.

| Input | AH | 07h | Service number |
|---|---|---|---|
| | AL | 02h | Sub-service number |
| Output | AX | 00h: | Normal |
| | | 01h: | Low power |
| Sub-service 03h: Set Power Off Routine | | | |

The sub-service sets a routine to be called when the power supply is cut. If the service is designated into the registers AH and AL and the starting address of a power off processing routine is designated into the registers DS and DX, then when the power supply is thereafter cut, the processing routine thus set is executed.

| Input | AH | 07h | Service number |
|---|---|---|---|
| | AL | 03h | Sub-service number |
| | DS:DX | | Starting address of power off processing routine |
| Output | None | | |
| Sub-service 04h: Power Off Enable/Disable by Opening CD Drive | | | |

The sub-service sets whether or not the power supply should be cut when the inner lid 2 is opened. If the power supply should be cut when the inner lid 2 is opened, 00h is placed into the register BX, but if the power supply should not be cut, any other value is placed into the register BX.

| Input | AH | 07h | Service number |
|---|---|---|---|
| | AL | 04h | Sub-service number |
| | BX | 00h: | Enable (default) |
| | | Else: | Disable |
| Output | None | | |

9. Service 08h: Supplementary Character Input by Menu

The service inputs a character of a special type from a menu.

Sub-service 00h: Disable/Enable Supplementary Character Input by Menu

The sub-service enables or disables a character inputting function of a menu type. When the function should be enabled, 00h is placed into the register BX, but when the function should be disabled, any other value is placed into the register BX.

| Input | AH | 08h | Service number |
|---|---|---|---|
| | AL | 00h | Sub-service number |
| | BX | 00h: | Enable |
| | | Else: | Disable (default) |
| Output | None | | |

10. Service 09h: Special Key

The service relates to the special key 28.

Sub-service 00h: Enable/Disable Special Key

The sub-service enables or disables the function of the special key 28. When the function should be enabled, 00h is placed into the register BX, but when the function should be disabled, any other value is placed into the register BX.

| Input | AH | 09h | Service number |
| --- | --- | --- | --- |
| | AL | 00h | Sub-service number |
| | BX | 00h: | Enable (default) |
| | | Else: | Disable |
| Output | None | | |

Figure 15:
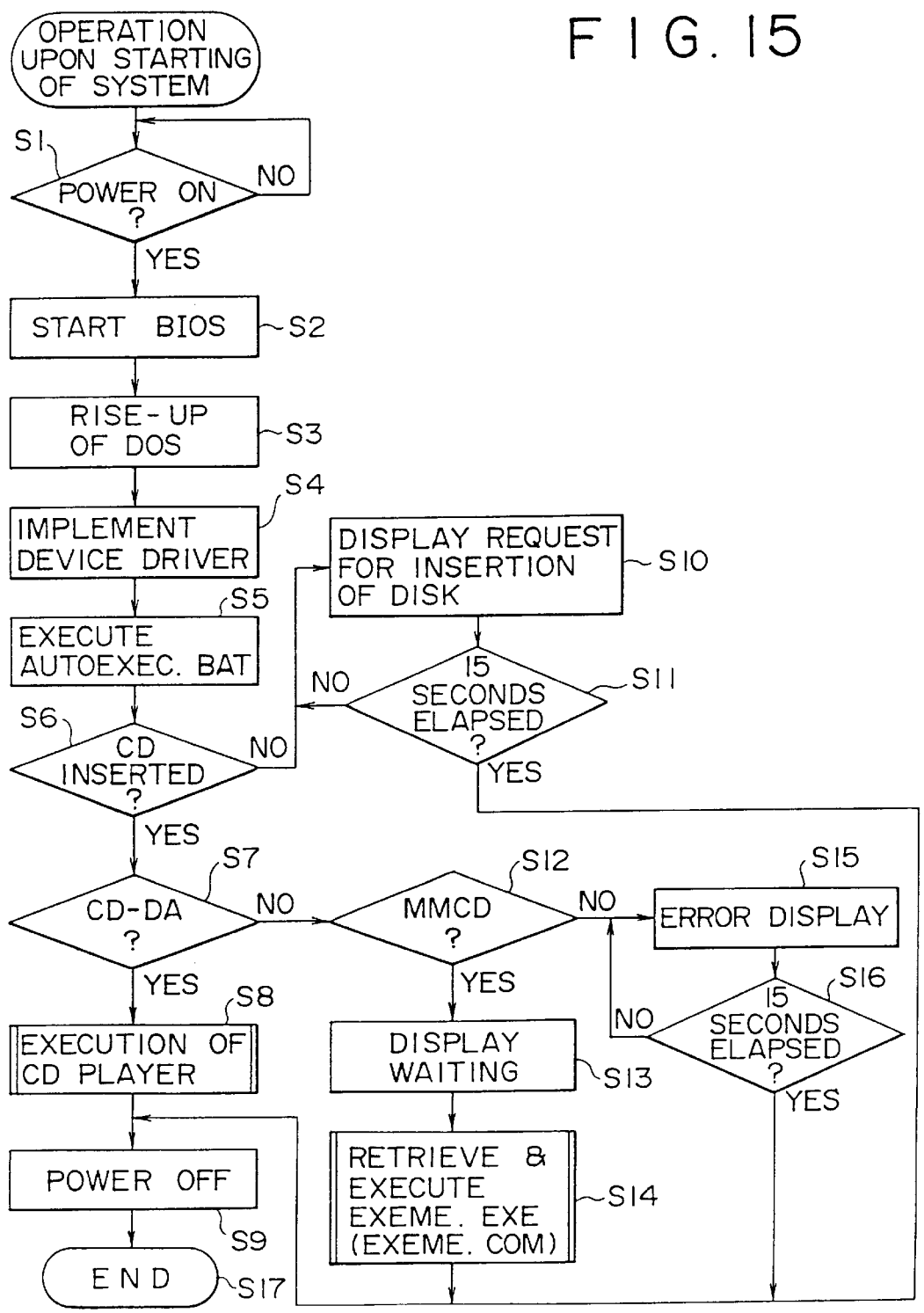
FIG. 15 is a flow chart illustrating operation of the apparatus shown in FIG. 10.

Operation of the apparatus P1 to P3 described hereinabove with reference to FIG. 10 will be described below with reference to the flow chart of FIG. 15.

First, processing of operation upon starting of the system will be described. If it is detected at step S1 that the power supply is made available, then the control sequence advances to step S2, at which the BIOS is initialized. Consequently, various mechanical sections of the apparatus are put into a controllable condition. Then at step S3, the DOS boots up. The DOS then installs a device driver at step S4. In particular, the MS-DOS reads a program CONFIG. SYS. The program CONFIG. SYS describes programs CDROMXA.SYS and PIEX.SYS as drivers for the programs CD-ROMXA and PIEX, respectively. Consequently, the programs CDROMXA and PIEX can thereafter boot up.

The control sequence then advances to step S5, at which the DOS executes a program AUTOEXEC.BAT. A program SHELL.COM is described in the program AUTOEXEC.BAT and is executed.

The program SHELL.COM determines whether or not a CD is inserted in the apparatus. In particular, the actuator for the optical pickup 71 shown in FIG. 8 is driven so that the focusing servo loop is started. When a CD is loaded in position in the apparatus, the focusing servo loop is locked. But on the contrary when no CD is loaded in the apparatus, the focusing servo loop is not locked. The CPU 84 determines from the focusing locking condition whether or not a CD is loaded in position in the apparatus.

If it is determined that no CD is loaded, the control sequence advances to step S10, at which the CPU 84 controls the LCD 100 to make a display to request insertion of a disk. In this instance, the message, for example, "Please insert a disk and restart the player.", is displayed. The display continues until it is determined at step S11 that 15 seconds have elapsed after starting the display. When such 15 seconds elapse, the control sequence advances to step S9, at which the power supply is cut, and then the processing comes to an end at step S17.

On the other hand, if it is determined at step S6 that a CD is loaded in position, the control sequence advances to step S7, at which it is determined whether or not the CD is an ordinary CD (CD-DA) for music. A CD-DA has audio data recorded on a track 1 thereof. The CPU 84 thus reads the track 1 and determines, when audio data are recorded on the track 1, that the CD is a CD-DA. The control sequence thus advances to step S8, at which a program CDPLAYER, which is a program for reproducing a CD-DA, is executed. Consequently, the user can thereafter reproduce the CD-DA by various operations of the apparatus.

Then, when reproduction of the CD-DA comes to an end, the control sequence advances to step S9, at which the power supply is cut, and then at step S17, the processing comes to an end.

On the other hand, if it is determined at step S7 that the CD loaded in position in the apparatus is not a CD-DA, the control sequence advances to step S12, at which it is determined whether or not the CD is an MMCD (multimedia CD-ROM), that is, that one of various CD-ROMS which can be used in the present system. An MMCD which can be used in the present system has a PVD (Primary Volume Descriptor) recorded at the position of the 16th frame of 2 seconds, 0 minute. The PVD includes, for example, such data as listed in Table 1 below:

TABLE 1

| BP | Field Name | Contents |
| --- | --- | --- |
| 1–1050 | Conforming to ISO9660:1998(E) | |
| 1025–1050 | XA Label | |
| 1051–1053 | Identifying Signature | 'PIX' ascii |
| 1054 | Version | 01h numeric |
| 1055–1086 | Disc Name | ASCII code > = 20h |
| 1087–1088 | Default Language | 0001h Little Endian Short |
| 1089–1092 | Application Id of EXEME.EXE | Little Endian Long |
| 1093–1104 | Application Name of EXEME.EXE | ASCII code > = 20h |
| 1105–1178 | Reserved | all 00h's |

As seen from Table 1 above, the 'PIX' is described as an Identifying Signature at byte pointers (BP) 1051 to 1053 of the PVD. When the CPU 84 can read the PIX from the PVD, it determines that the CD is an MMCD, but when it cannot read the PIX, it determines that the CD is a CD-ROM which cannot be read with the present apparatus.

When it is determined at step S12 that the CD loaded in position in the apparatus is not an MMCD, the control sequence advances to step S15, at which an error display is effected. In this instance, for example, the message "This disc is not playable on the Multimedia CD-ROM Player." is displayed on the LCD 100. The display continues until it is determined at step S16 that 15 seconds have elapsed. Then, when 15 seconds elapse, the control sequence advances to step S9, at which the power supply is cut, and then, the processing comes to an end at step S17.

On the other hand, when it is determined at step S12 that the CD loaded in position in the apparatus is an MMCD, the control sequence advances to step S13, at which a display to request waiting for a moment is effected. In this instance, for example, the message "Now starting-up xxxxx. Please wait one moment." is displayed on the LCD 100. Here, the name of the disk described at the BPs 1055 to 1086 of the PVD above is displayed at the location of xxxxx.

Thereafter, the control sequence advances to step S14, at which retrieval of the program EXEME.EXE or EXEME.COM is performed and the processing of the program is executed. After the processing at step S14, the control sequence advances to step S9. at which the power supply is cut, and then to step S17, at which the processing comes to an end.

Figure 13A:
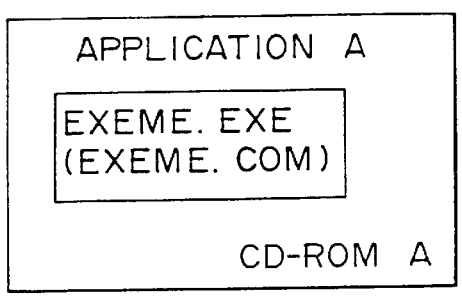
FIGS. 13(A) and 13(B) are diagrammatic views illustrating application programs for use with an information processing system of the present invention.
Figure 13B:
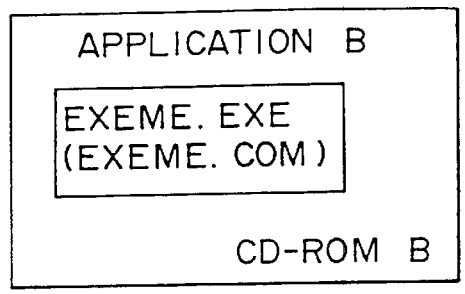

Details of the subroutine at step S14 will be described below with reference to the flow chart of FIG. 16. Processing is started at step S20, and at step S21, the program EXEME-EXE (or EXEME.COM) is retrieved from the root directory on the CD-ROM 66 loaded in position in the apparatus. As shown in FIG. 13, an MMCD loaded in any of the apparatus P1 to P3 has the program EXEME.EXE or EXEME.COM recorded thereon without fail. The CPU 84 stores the program EXEME.EXE read out from the CD-ROM 66 into the D-RAM 91 at step S22. Then, the control sequence advances to step S23, at which the entry point to a program PIEX is retrieved. Processing of the various services described hereinabove is executed by accessing the entry point to the program PIEX. Detailed processing of the entry point will be hereinafter described with reference to FIG. 17.

After an entry point is retrieved at step S23, the control sequence advances to step S24, at which initializing processing of the program PIEX is executed. The initializing processing of the program PIEX will be hereinafter described in detail with reference to the flow chart of FIG. 18.

After the initializing processing of the program PIEX is completed in this manner, the control sequence advances to step S25, at which processing according to an application program or programs read out successively from the CD-ROM 66 is executed. Then, when the processing of the application comes to an end, the control sequence advances to step S26, at which processing for ending the program PIEX is executed. Also details of the processing for ending the program PIEX will be hereinafter described with reference to the flow chart of FIG. 19. After the processing for ending the program PIEX is completed, the control sequence advances to step S27, at which the control sequence returns to step S14 of FIG. 15, from which the control sequence then advances to step S9.

In summary, in the present construction, the program EXEME.EXE is read out without fail so that the initializing processing and the ending processing described in the EXEME.EXE are executed. Further, when necessary, the program PIEX is read out at any time during processing of an application so that necessary processing is executed.

Now, details of the processing of get entry point at step S23 in FIG. 16 will be described with reference to the flow chart of FIG. 17. First, at step S30, execution of the processing is started, and then at step S31, a device '$$PIEX$$' is opened. In the program PIEX, the name of a device is described as '$$PIEX$$' in any application. When the opening processing of the program PIEX has been executed successfully, a handle number is retrieved. When it is determined at step S32 that such handle number has not been retrieved, that is, when the opening processing for the device '$$PIEX$$' has not been completed successfully, the control sequence advances to step S36, at which an error display is effected. In this instance, the message, for example, "PIEX not found.", is displayed on the LCD 100. Then, the control sequence advances to step S37, at which the power supply to the apparatus is cut and the processing comes to an end.

On the other hand, when it is determined at step S32 that a handle number has been retrieved (the opening processing of the device '$$PIEX$$' has been completed successfully), the control sequence advances from step S32 to step S33, at which an entry point is got by the IOCTL service of the MOS-DOS. In order to execute the service of the program PIEX described above, it is necessary to issue a far call to the entry point managed by the MS-DOS. Accordingly, in order to execute the services of the program PIEX, it is necessary to get such entry point in advance. At step S34, it is determined whether or not the processing of getting such entry point has been executed successfully. When the entry point has not been got successfully, the control sequence advances from step S34 to step S36, at which an error display is effected, and then to step S37, at which the power supply to the apparatus is cut and the processing is ended.

Figure 16:
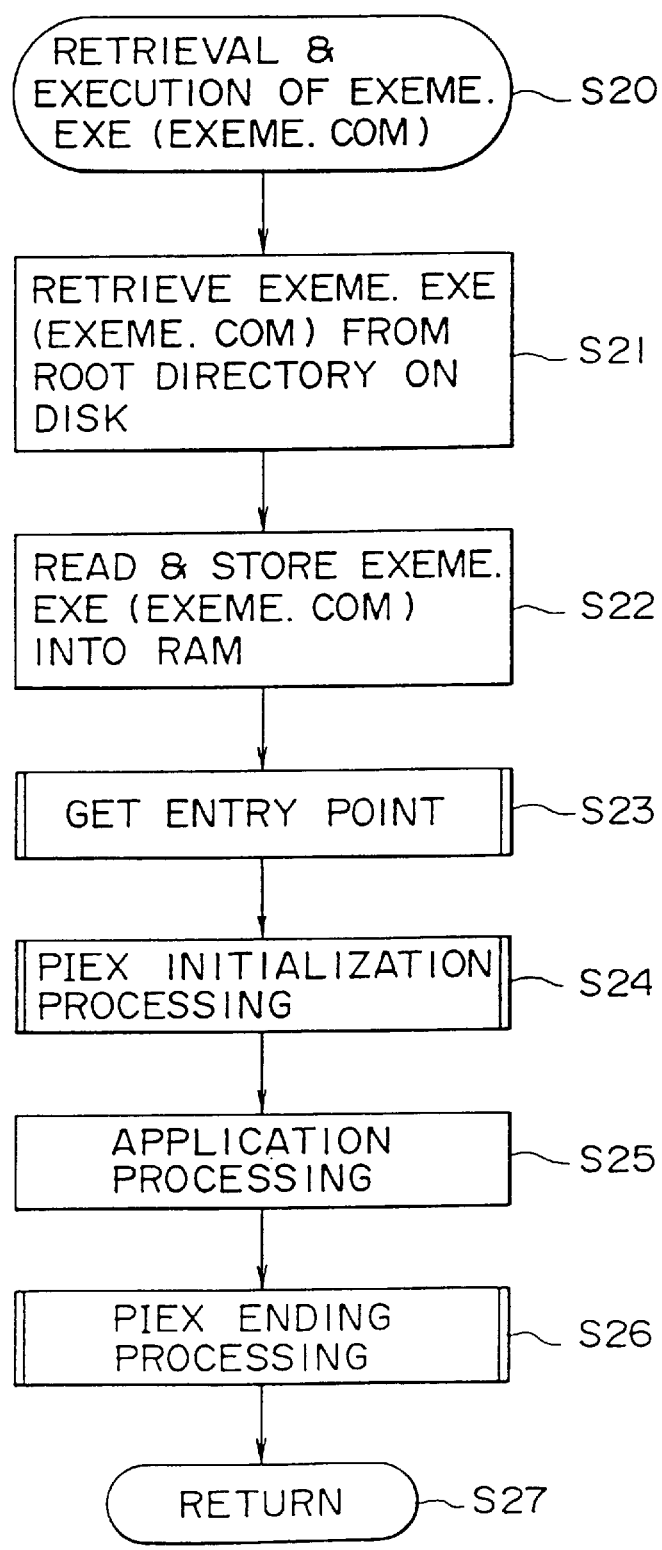
FIGS. 16 to 19 are flow charts illustrating detailed processing at different steps of the flow chart of FIG. 15.
Figure 17:
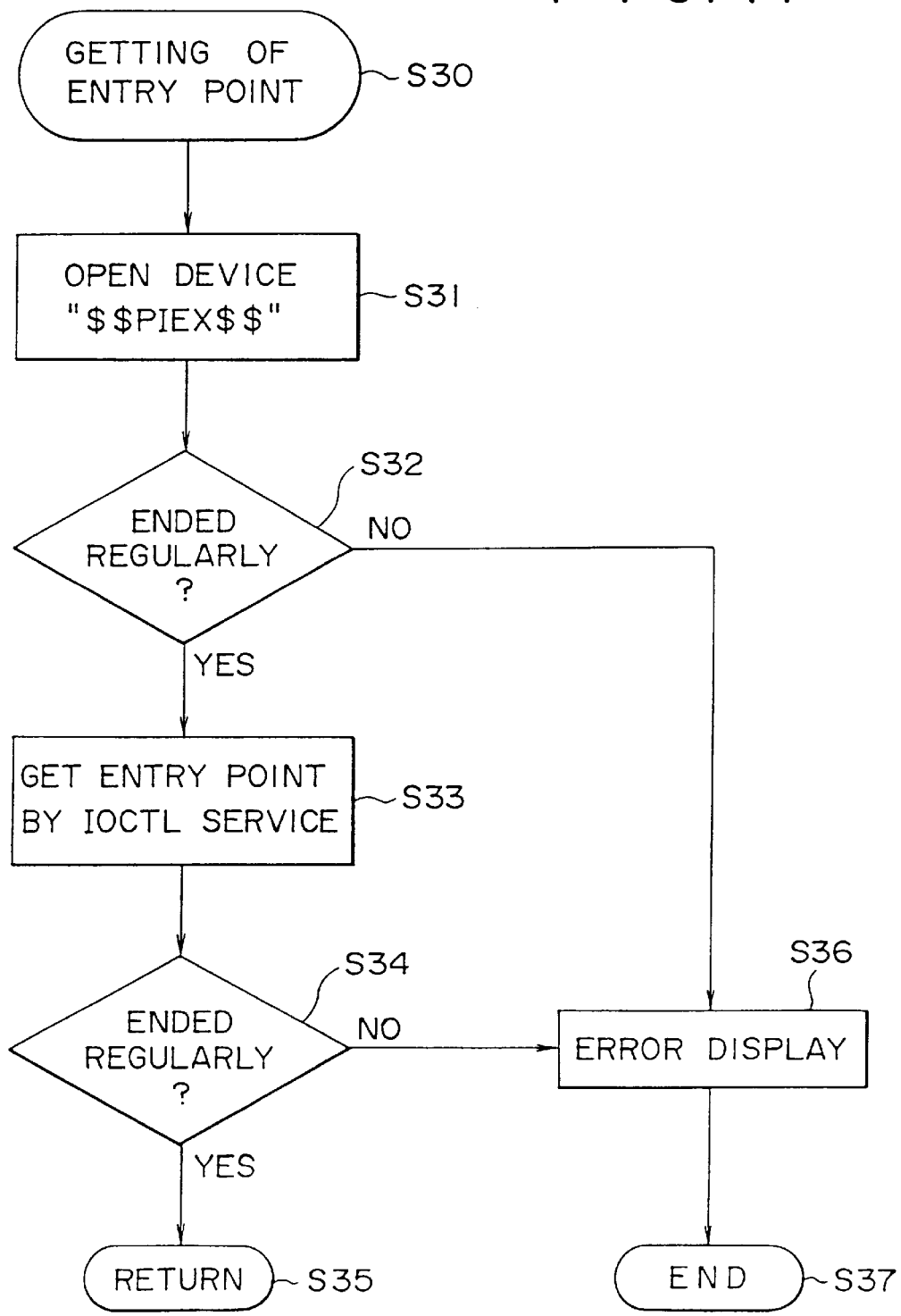

When it is determined at step S34 that an entry point has been gotten successfully, the control sequence returns from step S35 to step S23 of FIG. 16.

Figure 18:
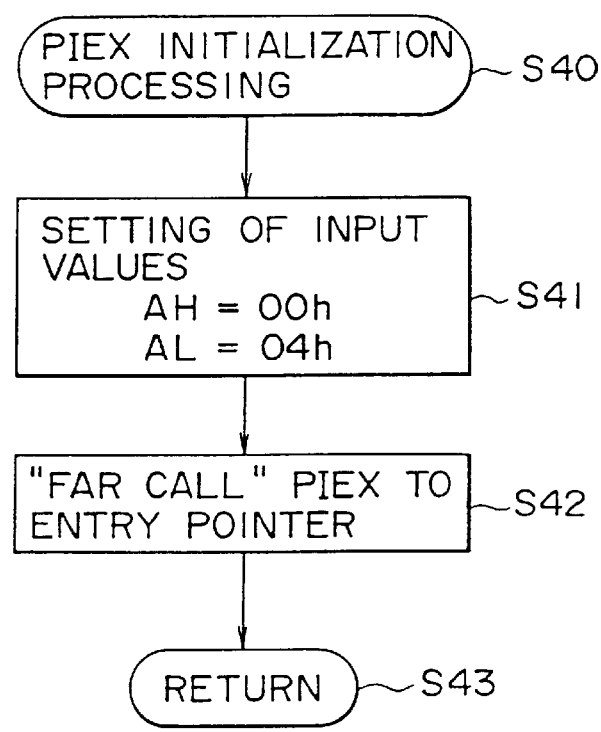

After the entry point which is necessary to execute the services of the program PIEX has been gotten in such a manner as described above, the initializing process of the program PIEX shown in FIG. 18 is executed at step S24.

Referring now to FIG. 18, the initializing processing of the program PIEX is started from step S40, and at step S41, the service number 00h and the sub-service number 04h for execution of the initializing service of the program PIEX described above are placed into the registers AH and AL, respectively. Then at step S42, a far call to the entry point to the program PIEX is executed. Thereafter, the control sequence returns from step S43 to step S24 of FIG. 16.

Figure 20A:
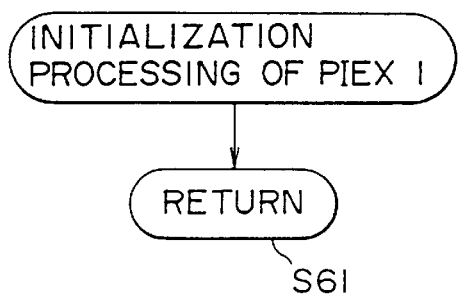
FIGS. 20(A) and 20(B) are flow charts illustrating contents of processing executed by different ones of the apparatus of FIG. 10 corresponding to the processing illustrated in FIG. 18.

The program PIEX1 for the apparatus P1 shown in FIG. 10 executes, when the far call for initializing processing is accepted, returning processing immediately at step S61 as seen from FIG. 20(A). In other words, in this instance, the initializing processing is ended immediately without executing any special processing.

Figure 20B:
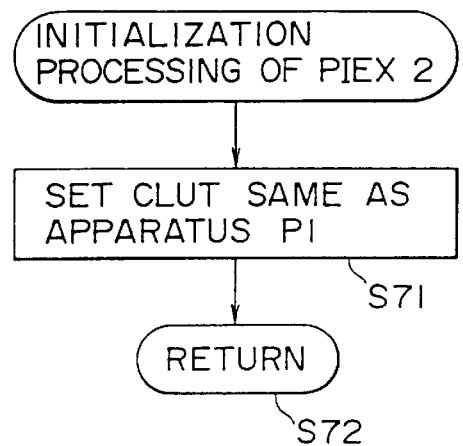

In contrast, in the apparatus P2 of FIG. 10, processing of setting the color lookup table stored in the RAM 102 to the same as that of the apparatus P1 is executed at step S71 as seen in FIG. 20(B). Thereafter, the control sequence returns from step S72 to the original processing.

That is, while the apparatus P1 can display 256 different colors (fixed colors), the apparatus P2 can display 256 different colors selected arbitrarily from about 1,280,000 different colors (fixed colors) using a color lookup table. To this end, the apparatus P2 has a color lookup table in the RAM 102 so that it may display 256 different colors set in the RAM 102.

In this instance, since any application program for the apparatus P1 does not take processing of designating 256 colors into the color lookup table into consideration, if it is attempted to execute the application program on the apparatus P2, when the program PIEX2 is not present, the colors cannot be displayed. However, in the present construction, predetermined 256 different colors identical with those of the apparatus P1 are initialized into the color lookup table at step S71 of the program PIEX2 as seen from FIG. 20(B). Consequently, any application program developed for the apparatus P1 can be used on the apparatus P2, and the same processing is executed successfully.

Here, if the processing is ended while the 256 different colors in the color lookup table remain set for the CD-ROM 66 being currently loaded in the apparatus, when a different CD-ROM 66 is subsequently loaded into the apparatus P2, a normal color display may not possibly be effected. Therefore, the processing for ending the program PIEX shown at step S26 of FIG. 16 is executed in such a manner as illustrated in FIG. 19.

Figure 19:
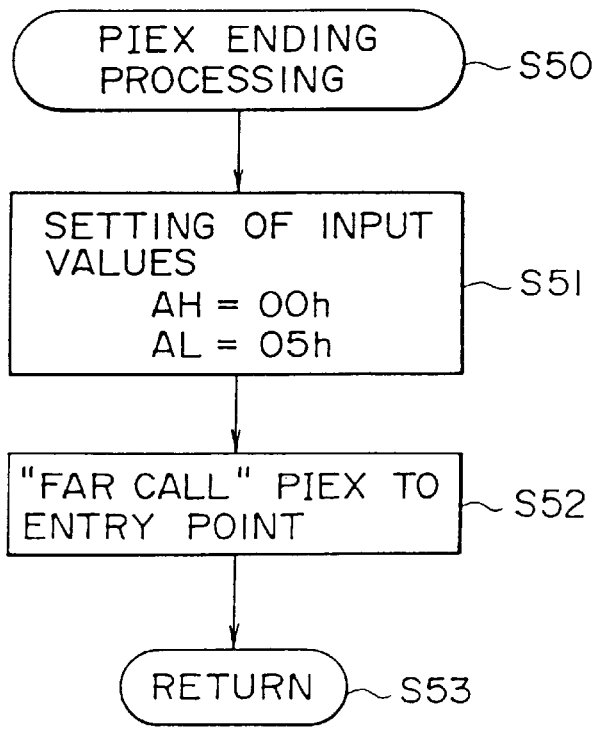

Referring now to FIG. 19, the processing is started at step S50, and at step S51, the service number 00h and the sub-service number 05h for starting the ending service described above are placed into the registers AH and AL, respectively. Then at step S52, a far call to the entry point to the PIEX corresponding to the set values is issued. Thereafter, the control sequence returns from step S53 to the original processing.

Figure 21A:
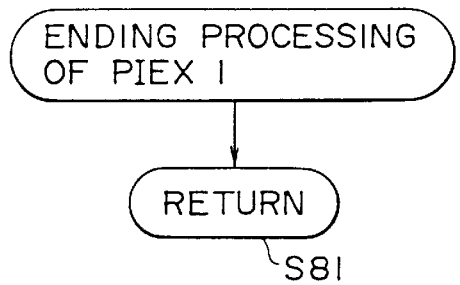
FIGS. 21(A) and 21(B) are flow charts illustrating contents of processing executed by different ones of the apparatus of FIG. 10 corresponding to the processing illustrated in FIG. 19.
Figure 21B:
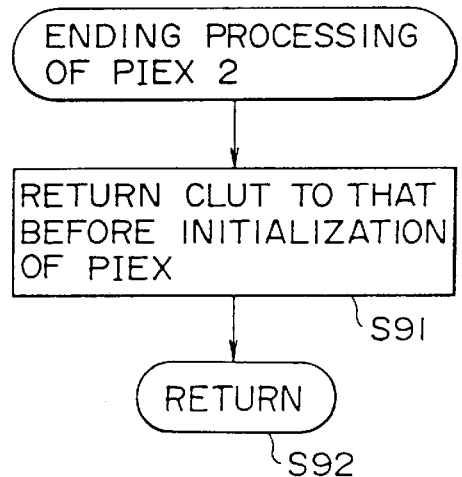

In the program PIEX1 for the apparatus P1. returning processing is executed immediately at step S81 as shown in FIG. 21(A). In other words, in this instance, substantially no special processing is executed. In contrast, in the apparatus P2, processing of returning the color lookup table into a condition before initialization of the program PIEX is executed at step S91, and then the control sequence returns from step S92 to the original processing, as shown in FIG. 21(B). Since the color lookup table is returned into a condition (default condition) before initialization which has been performed for an application program for the apparatus P1 in this manner, when some other CD-ROM is thereafter loaded into the apparatus, a normal color display is effected.

Figure 22:
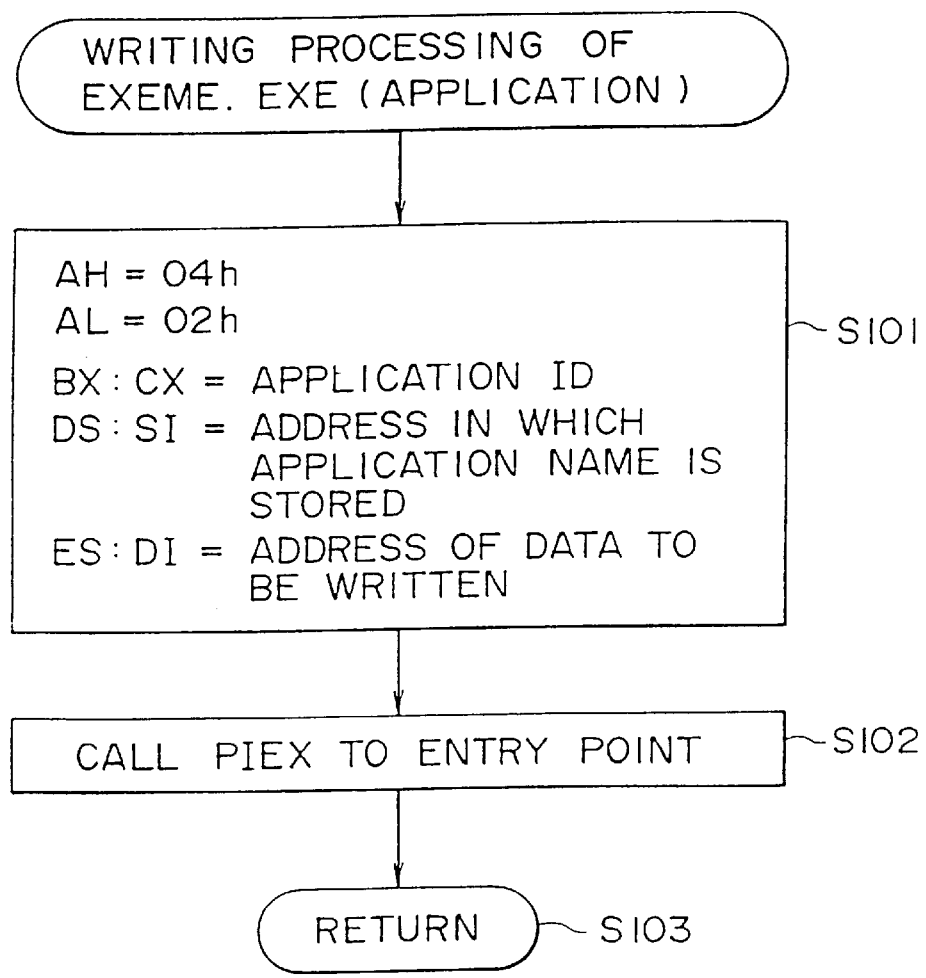
FIG. 22 is a flow chart illustrating processing of the apparatus of FIG. 10 at a certain step of the processing illustrated in FIG. 16.

On the other hand, when data are to be recorded as processing of the program EXEME.EXE in the application processing at step S25 of FIG. 16, processing, for example, illustrated in the flow chart of FIG. 22 is executed. Referring to FIG. 22, first at step S101, the service number 04h and the sub-service number 02h for writing data into the EEPROM 87 are placed into the registers AH and AL, respectively. Then, an application ID is placed into the registers BX and CX; an address in which an application name is stored is placed into the registers DS and SI; and an address of a buffer in which data to be written are stored is placed into the register ES and DI. After the processing is performed, a far call to the entry point to the program PIEX corresponding to such input data is issued at step S102. Thereafter, the control sequence returns from step S103 to the original processing.

Figure 23A:
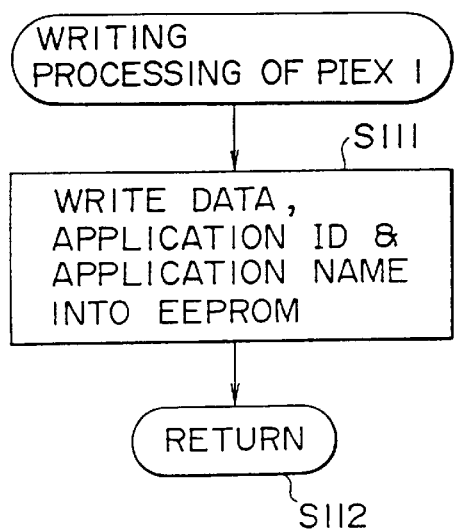
FIGS. 23(A) and 23(B) are flow charts illustrating processing executed by different ones of the apparatus of FIG. 10 corresponding to the processing of FIG. 22.

In the program PIEX1 for the apparatus P1, when the far call to the entry point for writing into the EEPROM 87 is accepted, the data are written into the EEPROM 87 together with the application ID and the application name in accordance with the format described hereinabove, as shown in FIG. 23(A). Then, the control sequence returns from step S112 to the original processing.

Figure 23B:
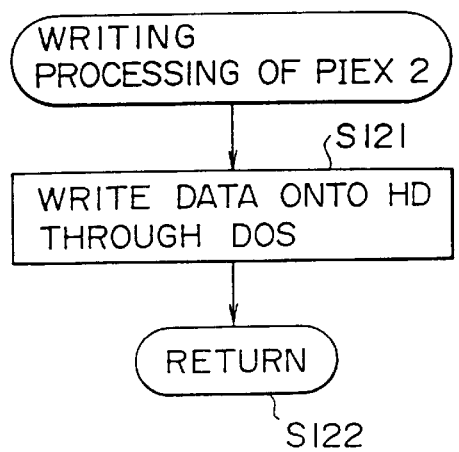

On the other hand, in the program PIEX2 for the apparatus P2, when the far call to the entry point is received, processing of writing data into the hard disk drive 111 by way of the DOS is executed at step S121 as shown in FIG. 23(B). Thereafter, the control sequence returns from step S122 to the original processing.

While the EEPROM 87 is provided in the apparatus P1, the EEPROM 87 is not provided in the apparatus P2, but the hard disk drive 111 is provided instead in this manner. In this instance, even if an application program prepared for the apparatus P1 is used on the apparatus P2, data can be read in correctly (even if the EEPROM 87 is not provided, such a situation that the application cannot be applied is prevented).

Figure 24A:
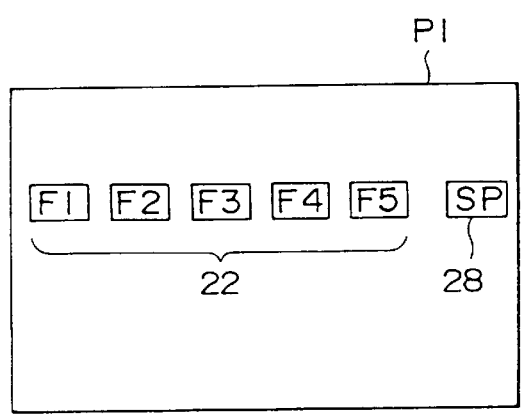
FIGS. 24(A) and 24(B) are diagrammatic views illustrating constructions of keyboards of different ones of the apparatus of FIG. 10.
Figure 24B:
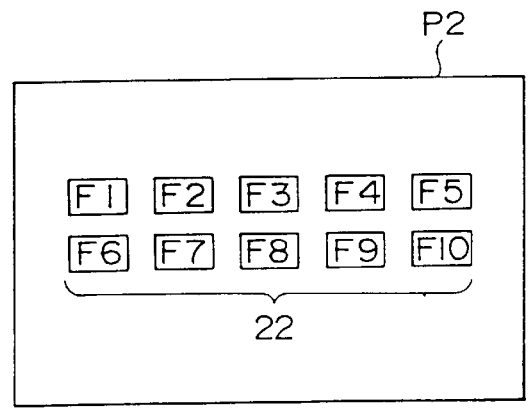

Furthermore, the following situation may take place. In particular, for example, in the apparatus PI, as shown in FIG. 24(A), as the function keys 22, the special key 28 is provided in addition to the keys F1 to F5. In contrast, in the apparatus P2, the keys F1 to F10 are provided as the function keys 22, but the special key 28 is not provided, as shown in FIG. 24(B). In such an instance, if an application program developed for the apparatus P1 is used on the apparatus P2, processing corresponding to the special key 28 cannot be executed on the apparatus P2 based on the application program. Further, if any one of the function keys F6 to F10, which are not provided on the apparatus P1, is manually operated, then an application program developed for the apparatus P1 may possibly operate in error.

Figure 25A:
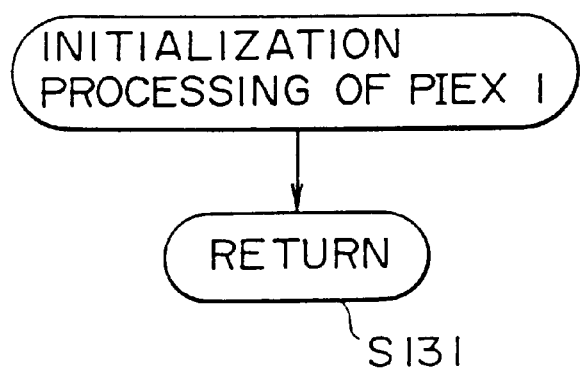
FIGS. 25(A) and 25(B) are flow charts illustrating processing of the apparatus having the keyboards shown in FIGS. 24(A) and 24(B), respectively.
Figure 25B:
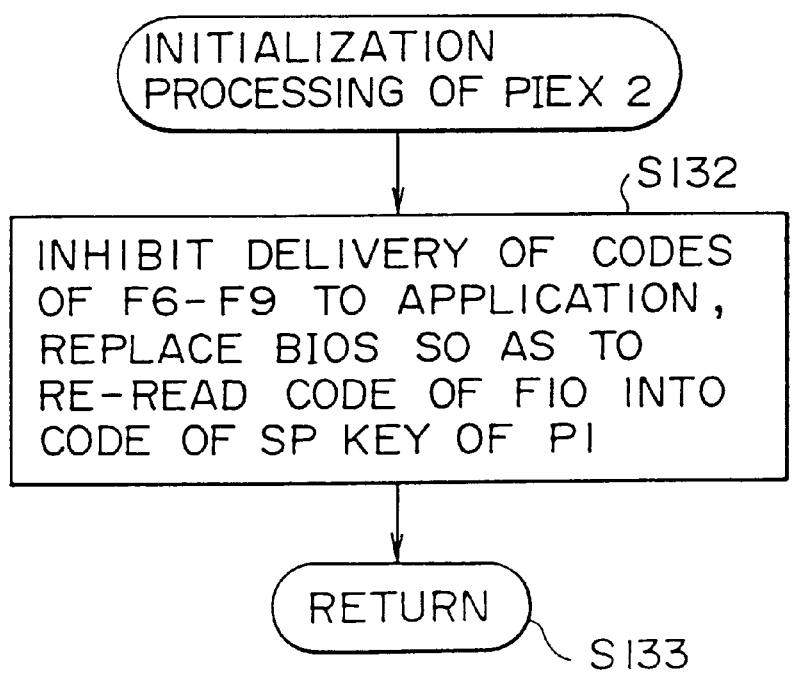

Thus, in such a case, the program PIEX1 for the apparatus P1 is constructed so that, as shown in FIG. 25(A), when initializing processing is called, returning processing is executed immediately at step S131. In other words, in this instance, substantially no special processing is executed. In contrast, in the program PIEX2 for the apparatus P2, as shown in FIG. 25(B), delivery of a code of any one of the function keys F6 to F9 is inhibited at step S132, and the BIOS is replaced so that a code of the function key F10 is re-read into the code of the special key 28 of the apparatus P1. Thereafter, the control sequence returns from step S133 to the original processing.

With such means as described above, the function key F10 on the apparatus P2 can be used in place of the special key 28 on the apparatus P1. Further, even if any one of the function keys F6 to F9 is manually operated, such a situation is prevented that an application program developed for the apparatus P1 operates in error on the apparatus P2.

Figure 26:
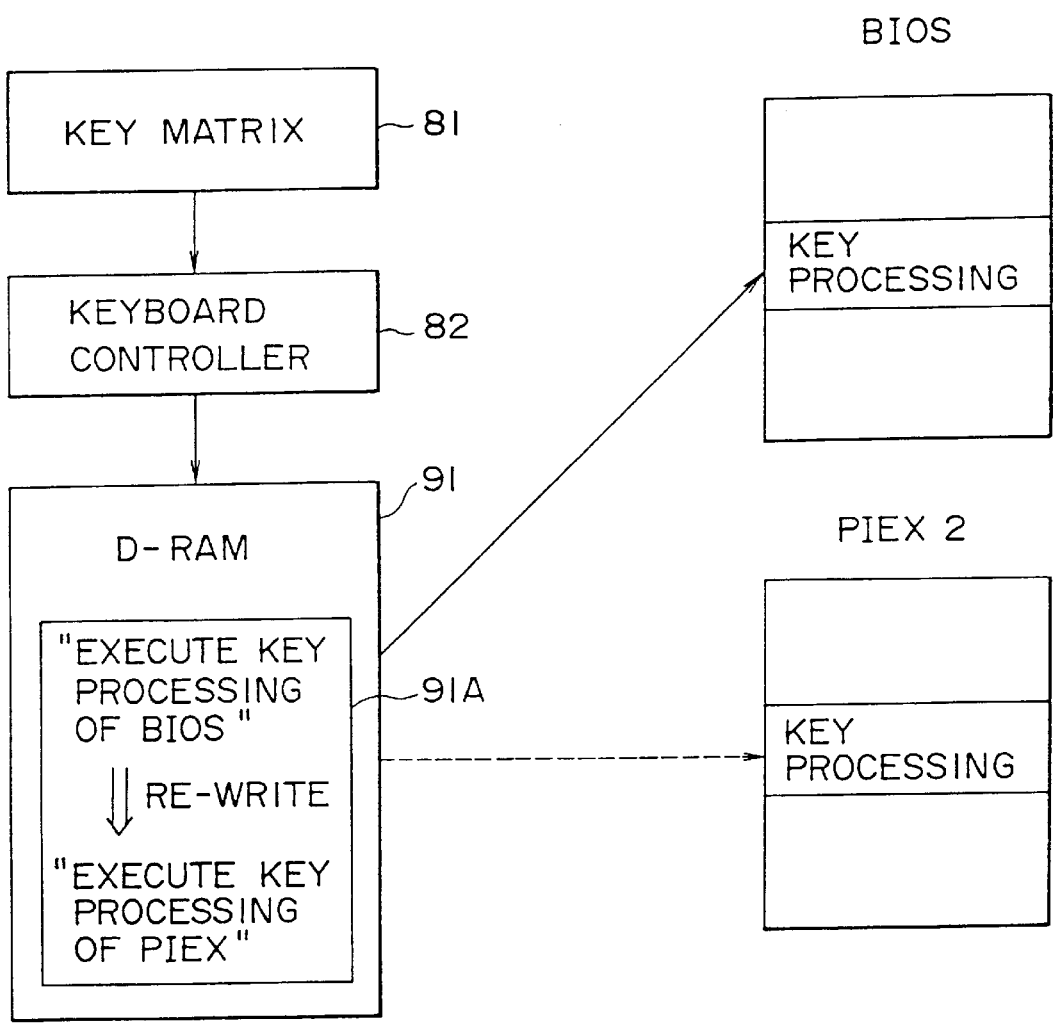
FIG. 26 is a schematic diagrammatic view illustrating the processing illustrated in FIG. 25(A) and 25(B)

FIG. 26 schematically illustrates the processing described above. In particular, when the key matrix 81 outputs a signal corresponding to an operated one of the keys to the keyboard controller 82, the keyboard controller 82 supplies data corresponding to the input to the D-RAM 92 so as to be stored into the latter. Normally, a command to execute key processing of the BIOS is described in an area 91A of the D-RAM 91. Accordingly, the key processing of the BIOS is normally executed, and ordinary processing on the apparatus P2 is executed.

In contrast, when an application program developed for the apparatus P1 is to be used on the apparatus P2, the description in the area 91A of the D-RAM 91 is re-written into the description to execute the key processing of the program PIEX2. Consequently, when the application program for the apparatus P1 is executed, the key processing of the program PIEX2 is executed in response to an input from the key matrix 81. As a result, any application program developed for the apparatus P1 can be used correctly on the apparatus P2.

By the way, in an apparatus of the type described above, when the environment of an application is to be changed, it is necessary to end the application once and then input a command or a name for starting a changing program to start up the changing program. Then, after the environment of use is changed with the changing program, the changing program is ended, and then the application program is started up again. Accordingly, there is a subject to be solved in that the procedure for changing the environment of use is complicated and requires much time.

Figure 27:
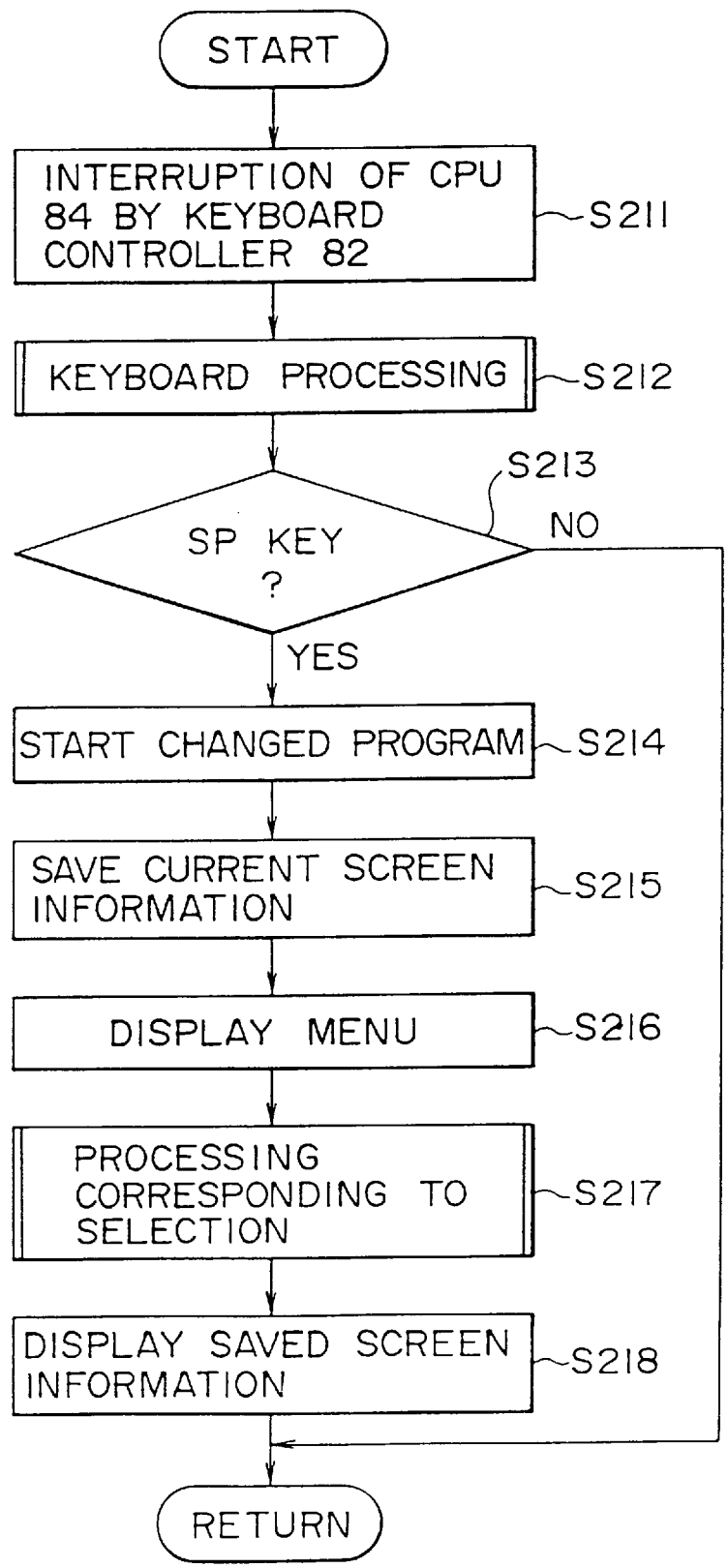
FIG. 27 is a flow chart illustrating interrupt processing initiated by a special key.

In the CD-ROM reproducing apparatus of the present embodiment, a change of the environment of use can be made in the following manner. In particular, when the user wants to change the environment of use after a program for reproducing processing of a CD-ROM 66 is started, the user will manually operate the special key 28. Consequently, processing illustrated in the flow chart of FIG. 27 is started as interrupt processing. Referring to FIG. 27, first at step S211, when the keyboard controller 82 detects operation of the special key 28 from the output of the key matrix 81, it applies an interruption to the CPU 84. Upon such interruption, the control sequence of the CPU 84 advances to step S212, at which a routine for keyboard processing is executed. Thereafter, the control sequence advances to step S213, at which it is confirmed that the special key 28 has been operated.

After the operation of the special key 28 is confirmed, the control sequence advances to step S214, at which the changing program is started up, and then to step S215, at which screen information including image data (data stored in the D-RAM 97) currently displayed on the LCD 100 is stored once into the D-RAM 91. Then. the control sequence advances to step S216, at which a menu for changing the environment of use is displayed on the LCD 100, for example, in the following manner.

1 Change or confirmation of time of automatic power off
2 Change or confirmation of stored contents of EEPROM 87
3 Change or confirmation of country information
4 End The user will select one of the operations (number) in accordance with the menu to change the environment of use a step S217. After the changing processing is completed, the control sequence advances to step S218, at which the picture information stored at step S215 is sent back to the LCD 100, thereby ending the interrupt processing. Consequently, the screen immediately prior to the operation of the special key 28 is restored, and the original application program is processed continuously.

Figure 28:
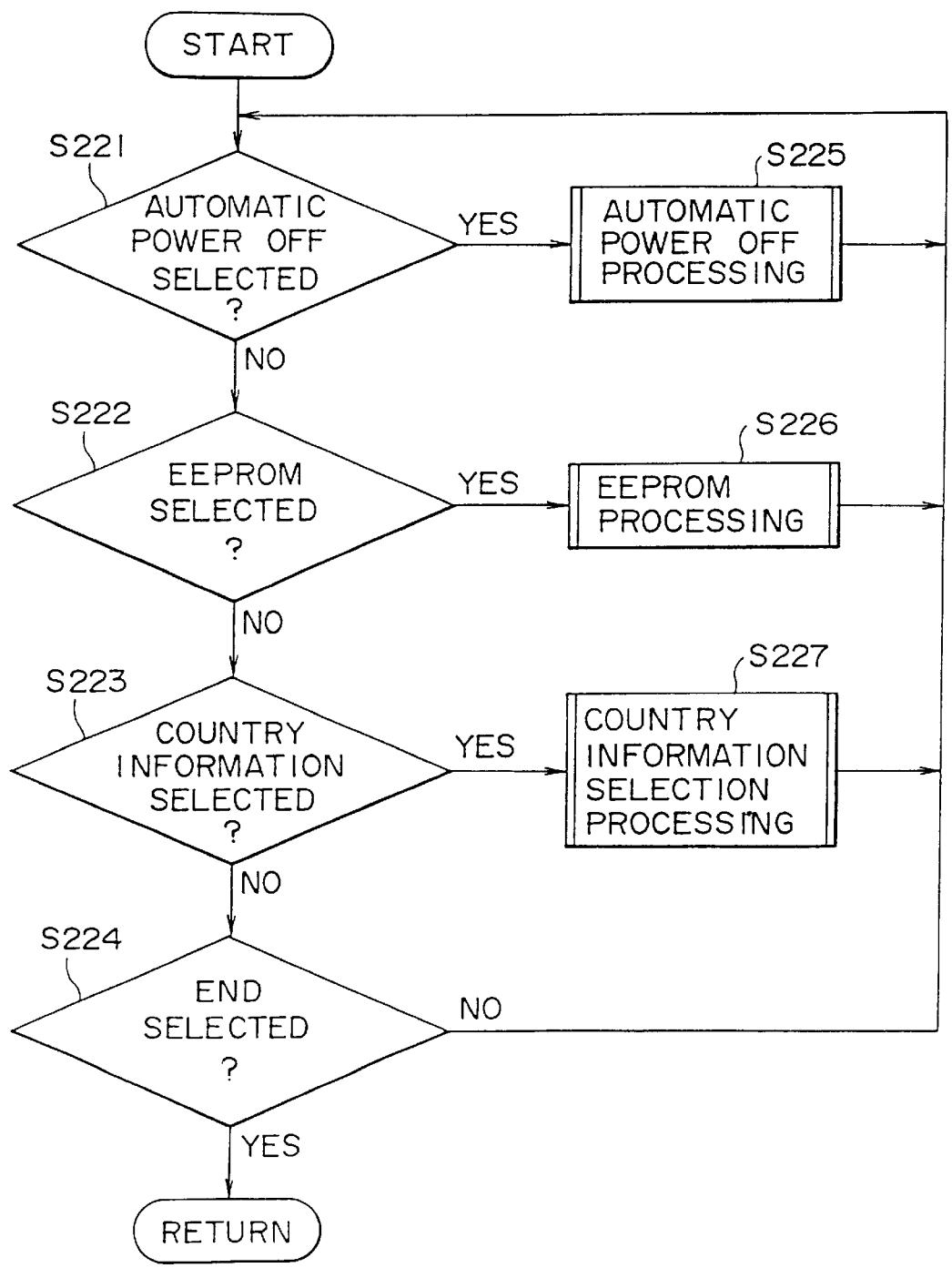
FIG. 28 is a flow chart illustrating detailed processing at a certain step of the flow chart of FIG. 27.

FIG. 28 illustrates detailed processing at step S217 of FIG. 27. Referring to FIG. 28, in the present processing, it is determined at steps S221 to S223 which one of the change of the time of the automatic power off, the change of stored contents of the EEPROM 87 and the change of the country information is selected by the user. The user will selectively operate, for example, the keys 29 to input one of the numbers described above to select a desired one of the operations from the displayed menu.

When the number 1, 2 or 3 is selected, the control sequence advances to step S225, S226 or S227, at which corresponding processing is executed. When, for example, the number 1 is selected, a preset time for automatic power off (a function of automatically cutting the power supply to the apparatus when the time for which no input is received reaches a predetermined time after inputting from a key or the like has been performed last) is displayed on the LCD 100. Looking at the display, the user will confirm the preset time at present, and when it is desired to change the preset time, the user will input a new time (including the case wherein the automatic power off function is to be stopped). When a new time is inputted, the CPU 84 updates the preset time for automatic power off.

On the other hand, when the number 2 is selected, data stored in the EEPROM 87 are displayed on the LCD 100. The data may include, for example, a read-out (reproduction) position of the CD-ROM 66, or when the CD-ROM 66 is for software of a game, a high score regarding the game. The former can realize a so-called book-marker function, which is a function of storing, when operation is to be ended once, a position of the CD-ROM to which the operation has proceeded and then starting, when operation is to be resumed later, reproduction from the stored position of the CD-ROM. Meanwhile, the latter can set an objective of effort of the game (objective toward which the effort is directed so as to mark a score higher than the high score).

Further, when the number 3 is selected, a language set at present and other available languages for the input mode are displayed. For example, when English, French or German can be selected as the language for the input mode, if the language selected at present is English, then English is displayed as the set language and French and German are displayed as available languages. The user can confirm the set language and the available languages from the display and can change the set language when necessary.

When the data are changed in such a manner as described above, the data after such change are stored into the EEPROM 87. After the changing processing comes to an end, the control sequence returns to step S221 in order to make a change of some other item.

When none of the numbers 1, 2 and 3 is selected, the control sequence advances to step S224, at which it is determined whether or not the number 4 (ending of the changing processing) is selected. When it is determined that the number 4 is not selected, the control sequence returns to step S221, but on the contrary when the number 4 is selected, processing of the changing processing is completed, and the control sequence advances to step S217 of FIG. 27.

The special key 28 is used not only in the program illustrated in FIG. 27 but also in another application program when the changing program for changing the environment of use is to be executed. Accordingly, irrespective of the kind of a program, the special key 28 can be used as a key for exclusive use (for common use) when the changing program is to be rendered operative. As a result, compared with another case wherein a different key must be operated for each different program, the possibility of an error in operation is reduced and the operability is improved.

It is to be noted that, if the changing program is replaced, for example, with another program for an electronic calculator, then the apparatus can have the function of an electronic calculator irrespective of an application program used.

While the present invention has been described so far by way of the embodiment wherein it is applied to a CD-ROM reproducing apparatus, the present invention can be applied to information processing apparatus of different types.

Having now fully described the invention, it will be apparent to one of ordinary skill in the art that many changes and modifications can be made thereto without departing from the spirit and scope of the invention as set forth herein.

What is claimed is:

1. An information processing system which assures the compatibility of a particular application program between a first model information processing apparatus and a second model information processing apparatus, comprising:

processing means for executing the particular application program under control of an operating system; and initializing means associated with said first model for causing said processing means, in response to said processing means executing the application program, to execute the initializing program associated with the first model for accommodating any differences between normal processing operations of said first and second models to establish compatibility between the processing operations of said first and second models, the initialization program establishing compatibility by causing predetermined normal operations of the first model to be substituted, if necessary, for those predetermined normal operations of the second model that the first model is not capable of performing such that when the application program requests the processing means to execute one of the predetermined normal operation of the second model, that the first model is not capable of performing, the processing means instead executes the predetermined normal operations of the first model caused to be substituted by the initializing program, wherein the first model further comprises:

random access memory means for storing data;

color display means for displaying data using a first set of colors which are selectable from a plurality of colors of a color palette;

keyboard input means having a plurality of keys for enabling the inputting of commands by a user, the keyboard input means having a first set of function keys; and a read only memory means for storing the functions to perform the predetermined operations of the first model to be substituted, if necessary during the processing of an application program, for the operations of the second model, including one or more of the following operations:

a) causing the color display means to display data using a predetermined set of colors which are not selectable from a larger group of colors by the information processing apparatus;

b) causing the keyboard input means to emulate a keyboard having a second set of function keys which are fewer in number than the function keys of the first set, wherein the random access memory means is a hard disk drive, operation of which is caused by the initialization program to substitute for operation of an EEPROM.

2. An information processing system as claimed in claim 1, wherein the color display means can display 256 colors arbitrarily selected from a color palette of 1,280,000 colors.

3. An information processing system as claimed in claim 1, wherein the initialization program causes the keyboard input means to reassign a function allocated to a predetermined key to another key.

4. A recording medium for use with an information processing system, wherein the first information processing system includes a processing means that executes an operating system, the recording medium having recorded thereon:
  a) an application program to be executed by the processing means, under the operating system;
  b) an initialization program to be executed by the processing means in response to the processing means executing the application program, wherein the initialization program is associated with a first model information processing apparatus for accommodating any differences between normal operations of the first model with normal operations of a second model information processing apparatus to establish compatibility between the processing operations of the first model and the second model, the initializing program establishing compatibility by causing predetermined normal operations of the first model to be substituted, if necessary, for those predetermined normal operations of the second model that the first model is not capable of performing such that when the application program requests the processing means to execute one of the predetermined normal operation of the second model, that the first model is not capable of performing, the processing means instead executes the predetermined normal operation of the first model caused to be substituted by the initializing program,
wherein said first model further comprises:
random access memory means for storing data;

color display means for displaying data using a first set of colors which are selectable from a plurality of colors of a color palette;

keyboard input means having a plurality of keys for enabling the inputting of commands by a user, the keyboard input means having a first set of function keys; and read only memory means for storing the functions to perform the predetermined operations of the first model to be substituted, if necessary during the processing of an application program, for the operations of the second model, including one or more of the following operations:
  a) causing the color display means to display data using a predetermined set of colors which are not selectable from a larger group of colors by the information processing apparatus;
  b) causing the keyboard input means to emulate a keyboard having a second set of function keys which are fewer in number than the function keys of the first set
wherein the random access memory means is a hard disk drive, operation of which is caused by the initialization program, when executed by the processing means of the first model, to substitute for operation of an EEPROM.

5. An information processing apparatus as claimed in claim 4, wherein the color display means can display 256 colors arbitrarily selected from a color palette of 1,280,000 colors.

6. An information processing apparatus as claimed in claim 4, wherein the initialization program, when executed by the processing means of the first model, causes the keyboard input means to reassign a function allocated to a predetermined key to another key.

* * * * *